United States Patent [19]

Katsura et al.

[11] Patent Number: 5,223,315
[45] Date of Patent: Jun. 29, 1993

[54] CONTAINER EQUIPPED WITH LABEL AND PRODUCTION METHOD THEREOF

[75] Inventors: Tadahiko Katsura; Toshifumi Tanahashi, both of Yokohama, Japan

[73] Assignee: Toyo Seikan Kaisha Ltd., Tokyo, Japan

[21] Appl. No.: 445,661

[22] PCT Filed: Apr. 6, 1989

[86] PCT No.: PCT/JP89/00372

§ 371 Date: Dec. 6, 1989

§ 102(e) Date: Dec. 6, 1989

[87] PCT Pub. No.: WO89/09689

PCT Pub. Date: Oct. 19, 1989

[30] Foreign Application Priority Data

| Apr. 6, 1988 | [JP] | Japan | 63-83033 |
| Jul. 21, 1988 | [JP] | Japan | 63-180328 |
| Aug. 19, 1988 | [JP] | Japan | 63-204782 |
| Sep. 13, 1988 | [JP] | Japan | 63-227569 |
| Oct. 12, 1988 | [JP] | Japan | 63-254924 |
| Nov. 17, 1988 | [JP] | Japan | 63-288989 |
| Nov. 17, 1988 | [JP] | Japan | 63-288990 |
| Mar. 17, 1989 | [JP] | Japan | 1-63816 |

[51] Int. Cl.⁵ .......... B32B 27/00; C09J 7/02; B65D 23/08; B29C 45/14
[52] U.S. Cl. ............... 428/36.92; 428/349; 428/220; 428/349; 428/359; 428/200; 428/204; 428/402; 156/232; 156/241; 156/DIG. 5; 264/516; 264/509
[58] Field of Search ........ 428/35.7, 36.92, 447, 428/518, 34.9, 220, 349, 35.9, 35.8, 36.6, 36.92, 200, 204, 402; 264/34.7; 156/DIG. 5

[56] References Cited

U.S. PATENT DOCUMENTS

| 4,037,020 | 7/1977 | Ishii et al. | 428/518 |
| 4,359,165 | 11/1982 | Jakobsen | 428/35 |
| 4,601,926 | 7/1986 | Jabarin et al. | 428/35 |
| 4,837,075 | 6/1989 | Dudley | 428/220 |

*Primary Examiner*—Ellis P. Robinson
*Assistant Examiner*—Charles R. Nold
*Attorney, Agent, or Firm*—Sughrue, Mion, Zinn, Macpeak & Seas

[57] ABSTRACT

In a hollow molded container equipped with a label and its production method, molding is made by use of a label consisting, as a base, of a stretched film of a plastic having a thermal shrinkage ratio greater than a mold shrinkage ratio of a plastic constituting the outer surface of a container, at a temperature 40° C. lower than the melting point or softening point of the plastic so that the label is bonded to the container at a residual equilibrium shrinkage ratio (Rs), defined below, of 0.5 to 100%: $Rs = L_1 - L_2/L_1$, where $L_1$ is a length of a label film peeled from the container and $L_2$ is a length when the peeled label film is brought to equilibrium at the temperature ($T_1$) described above. In this manner, crease and swelling of the label during labelling operation inside the mold can be prevented and adhesion and peel-resistance between the label and the container outer surface can be improved.

24 Claims, 6 Drawing Sheets

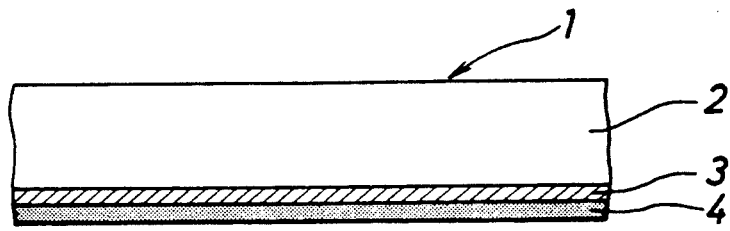
FIG. 1-A
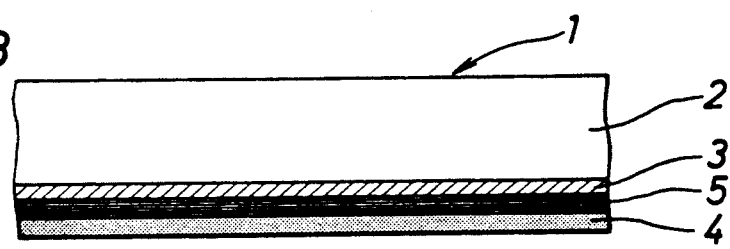
FIG. 1-B
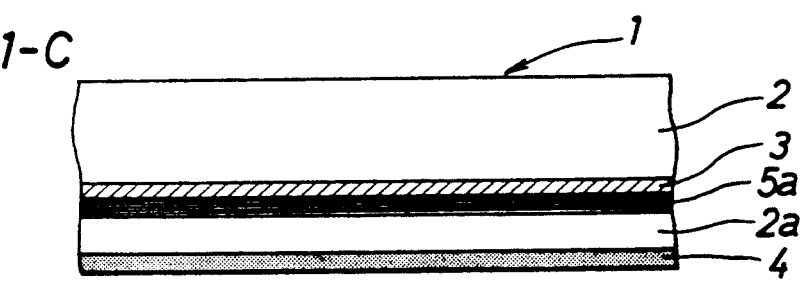
FIG. 1-C
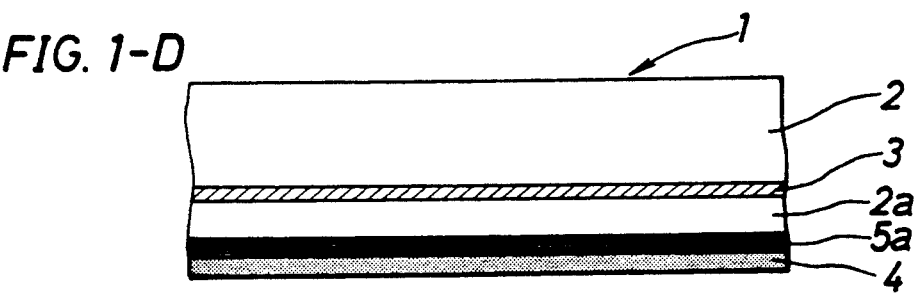
FIG. 1-D
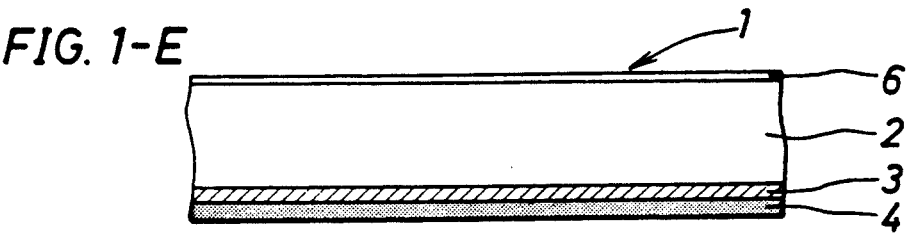
FIG. 1-E
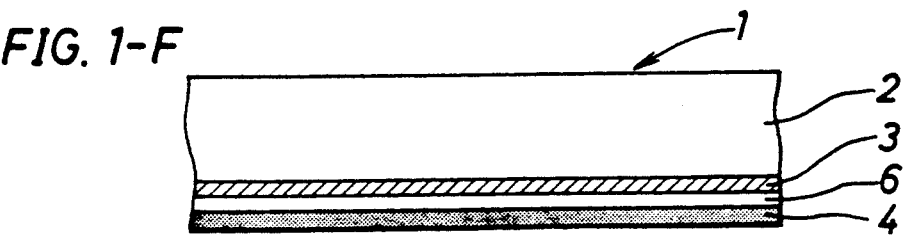
FIG. 1-F

FIG. 2
STEP A
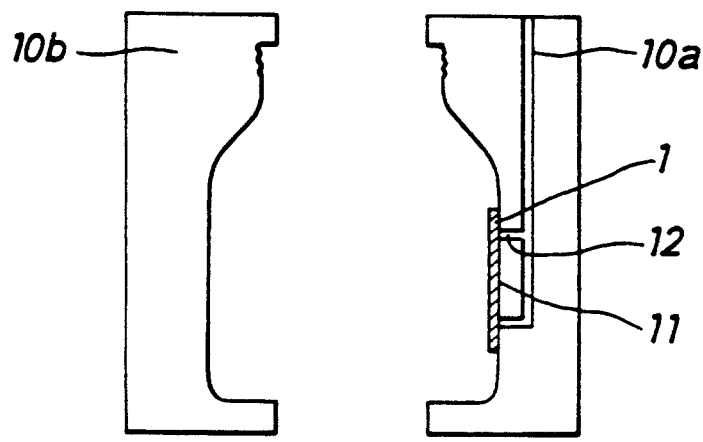
STEP B
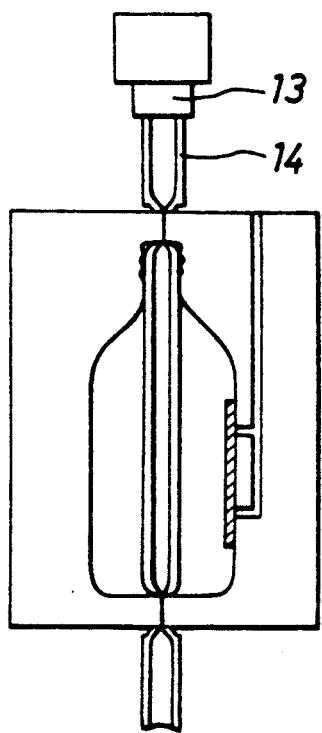
STEP C
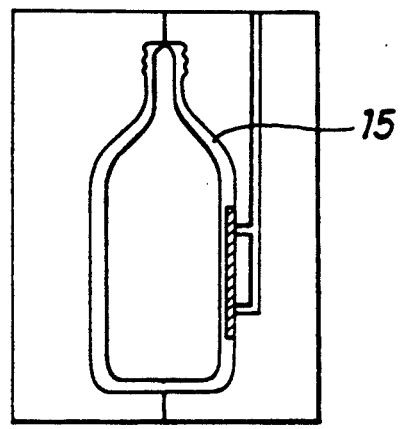

FIG. 6
STEP I
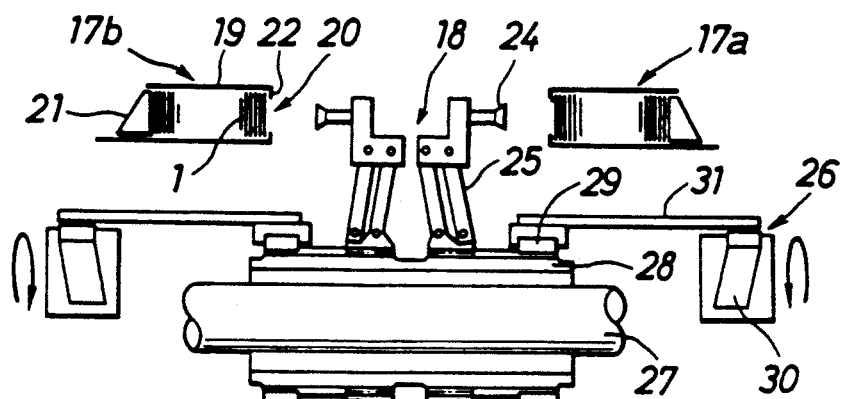
STEP II
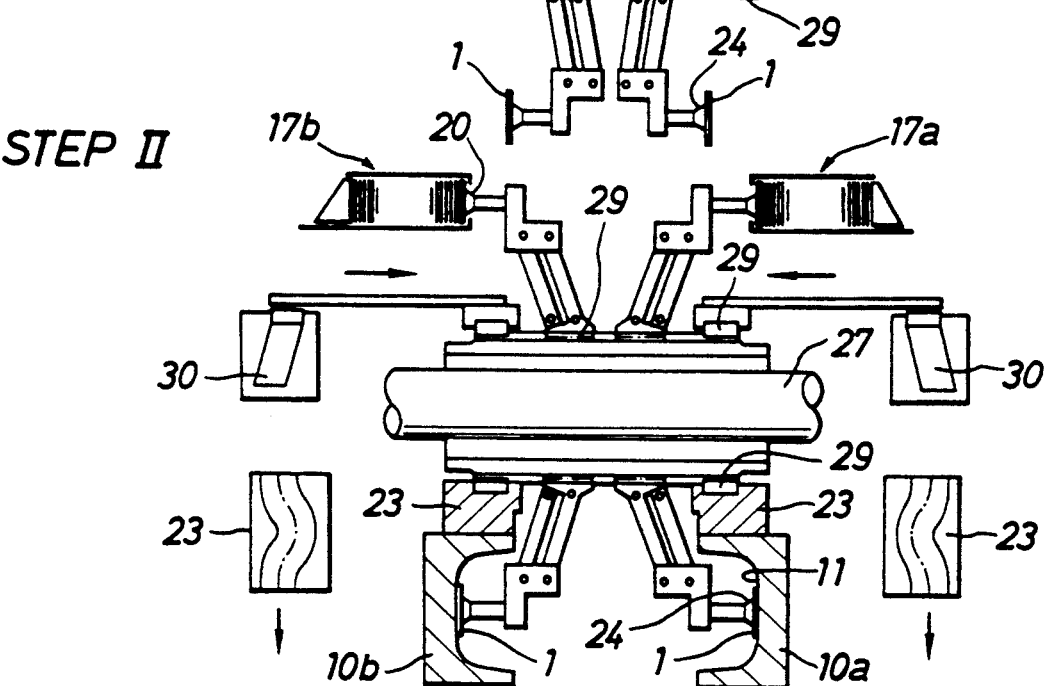
STEP III
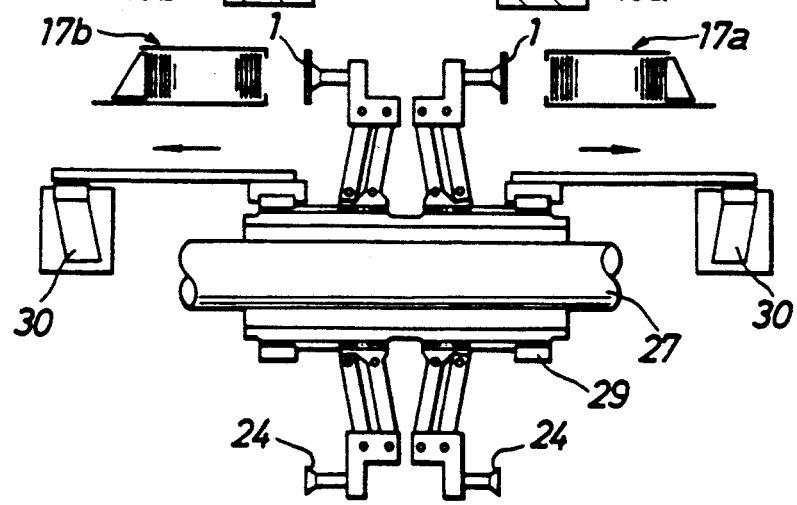

CONTAINER EQUIPPED WITH LABEL AND PRODUCTION METHOD THEREOF

BACKGROUND ART

1. Technical Field

The present invention relates to a labelled plastic vessel and a process for the preparation thereof. More particularly, the present invention relates to a labelled plastic vessel which has no bulge or wrinkle on the outer surface of an attached label and is excellent in the adhesion and peeling resistance of the label, and a process for preparing this labelled vessel by the in-mold labelling operation. Furthermore, the present invention relates to an adhesive label to be used for carrying out this process.

2. Description of the Prior Art

Attachment of a label indicating the content to a hollow-formed vessel is very important in the packaging technique because the attached label increases the commercial value of a packaged product and excites consumer's interest.

It has been known from old that a label is attached to a hollow-formed vessel by the in-mold labelling operation, and there is ordinarily adopted a method in which a label to be attached is held on the inner surface of a cavity of a forming mold by vacuum suction or the like and a plastic parison is subjected to hollow forming in this mold (see, for example, Japanese Patent Application Laid-Open Specification No. 202818/86).

A label composed mainly of a plastic film is preferable as the label to be attached by the in-mold labelling operation because the back surface can be printed and an image is sharp and excellent in the stain resistance. From the viewpoint of utilization of heat of the plastic vessel wall being formed, use of a heat-sensitive adhesive, especially a hot-melt adhesive, is advantageous.

However, in the case where a label composed of a plastic film is attached to a hollow-formed vessel by the in-mold labelling operation, wrinkling or bulging is caused in the label and the appearance characteristics of the label tend to degrade, and since the adhesion of the label to the outer surface of the vessel is insufficient, the label tends to peel or drop from the vessel during storage or transportation of the vessel. These tendencies are especially conspicuous in case of a composite label composed of a plastic film and a metal foil.

A heat-bondable film label of a plastic film comprising a hot-melt adhesive as the adhesive is disadvantageous in that in the in-mold labelling operation, it is often difficult to supply such labels precisely one by one and trouble with supplying a plurality of labels in the piled state to the side wall portion of a vessel is often caused. The reason is that since the smoothness of the film is high, adhesion is often caused between film labels and since the hot-melt adhesive is sensitive to heat, the stickiness is increased according to environmental conditions and the like.

An adhesive composed mainly of an ethylene/vinyl acetate copolymer, in which a tackifier is incorporated according to need, has been used as the hot-melt adhesive for labels. However, this known hot-melt adhesive is still insufficient in the heat resistance and chemical resistance. For example, in the case where hot filling is carried out for improving the preservability of the content (sterilization), deviation in a label or reduction of the bonding force tends to occur. Moreover, in case of vessels for cosmetics, toiletry goods, chemicals and the like, troubles such as peeling of labels and reduction of the bonding force are readily caused by the action of the content adhering to the outer surface of the vessel at the filling step. Gist of the Invention.

It is therefore a primary object of the present invention to prevent occurrence of wrinkling or bulging in a label in preparing a labelled plastic hollow-formed vessel by the in-mold labelling operation and improve the adhesion of the label to the outer surface of the vessel and the peeling resistance of the label.

Another object of the present invention is to provide a process in which the above-mentioned problems caused in preparing a labelled plastic vessel by the in-mold labelling operation are solved, it is possible to supply heat-bondable film labels separately one by one assuredly, and a strong bond can be formed between the label and the side wall of a plastic vessel being formed.

Still another object of the present invention is to provide a heat-bondable film label for the in-mold labelling operation, which has a capability of forming a beautiful and sharp printed image thereon, an excellent heat bondability and an excellent separate supplying property (anti-blocking property) in combination.

A further object of the present invention is to provide a label for the in-mold labelling operation, which can be attached to a polyolefin type plastic vessel with a high bonding strength by the in-mold labelling operation and can form a label-bonded portion having excellent heat resistance and chemical resistance.

In accordance with one fundamental aspect of the present invention, there is provided a process for the preparation of a labelled hollow vessel, which comprises blow-forming a single-layer or multiple-layer plastic parison or sheet in a blow mold having a label attached to the inner surface of a cavity thereof to bond the label to the surface of a side wall portion, wherein a label composed mainly of a drawn film of a plastic material having a heat shrinkage factor larger than the forming shrinkage factor of a plastic material constituting the outer surface of the vessel at a temperature ($T_1$) lower by 40° C. than the melting point or softening point of the plastic material constituting the outer surface of the vessel is used as the label.

In accordance with another aspect of the present invention, there is provided a labelled vessel comprising a plastic vessel formed by blow-forming and a label bonded to the surface of a side wall portion of the vessel by the in-mold labelling operation, wherein the label is a label comprising a drawn plastic film as the substrate and the label is bonded to the vessel so that the residual equilibrium shrinkage factor (Rs), defined by the following formula, of the drawn plastic film is in the range of from 0.5 to 100%:

$$Rs = \frac{L_1 - L_2}{L_1} \times 100 \quad (1)$$

wherein $L_1$ stands for the length of the label film peeled from the vessel and $L_2$ stands for the length of said peeled label film equilibriated at a temperature ($T_1$) lower by 40° C. than the melting point or softening point of the plastic material constituting the outer surface of the vessel.

The following labels are especially preferably used in the present invention.

(I) A heat-bondable film label comprising a plastic film layer, a print layer formed on the inner surface side of the plastic film layer, a hot-melt adhesive layer formed on the print layer and, if necessary, an overcoat layer formed on the outer surface side of the plastic film layer, wherein resin and/or inorganic beads having a particle size of 0.1 to 100 μm are included in any of the print layer, the hot-melt adhesive layer and the overcoat layer, and in any of the surfaces, the center line average height (JIS B-0601) is in the range of from 0.2 to 50 μm. Center line average height is calculated as center-line mean roughness.

Determination of Center-line Mean Roughness The center-line mean roughness, when the roughness curve has been expressed by y=f(x), shall be a value, being expressed in micrometers (μm), that is obtained from the following formula, extracting a part of measuring length l in the direction of its center-line from the roughness curve, and taking the center-line of this extracted part as the X-axis and the direction of vertical magnification as the X-axis.

$$R_a = \frac{1}{l} \int_0^l |f(x)| dx$$

Cut-off Value of Roughness Curve The cut-off value of the roughness curve, when a high-pass filter of −12 dB/oct in attenuation factor has been used in obtaining the roughness curve, shall be the wavelength corresponding to the frequency attaining a gain of 75%, hereinafter referred to as the "cut-off value."

Cut-off Values The cut-off values shall generally be the following six kinds: 0.08, 0.25, 0.8, 2.5, 8, 25 Unit: mm Standard Values of Cut-off Values The standard values of the cut-off value, unless otherwise specified, shall be in accordance with the divisions in Table 1.

TABLE 1

| Standard Values of Cut-off Value in Determining Center-line Mean Roughness | | |
|---|---|---|
| Range of center-line mean roughness | | Cut-off value |
| Exceeding | Max. | mm |
| | 12.5 μm $R_a$ | 0.8 |
| 12.5 μm $R_a$ | 100 μm $R_a$ | 2.5 |

Remark: Center-line mean roughness shall be determined by firstly designating the cut-off values. In carrying out the designation or instruction of the surface roughness, as it is inconvenient to designate that on all such occasions, unless otherwise required to specify, values of this table shall be used.

Measuring Length The measuring length shall generally be a value of three times or more of the cut-off value.

Indication of Center-Line Mean Roughness ($R_a$)

Designation of Center-Line Mean Roughness The designation of the center-line mean roughness shall be as follows:

| Center-line mean roughness___μm | Cut-off value___mm | Measuring length___mm |
|---|---|---| or

| ___μm $R_a$ | ac___mm | l___mm |
|---|---|---|

Remarks:
1. In the case where the value of the center-line mean roughness obtained by using the standard value of the cut-off value given in Table 1 is in the range shown in Table 1, the designation of the cut-off value may be omitted.
2. In the case where the measuring length is three times or more the cut-off value, the designation of the measuring length may be omitted.

Preferred Number Series of Center-Line Mean Roughness When the surface roughness is designated by the center-line mean roughness, unless otherwise required, the preferred number series of Table 2 shall be used.

TABLE 2

| Preferred Number Series of Center-Line Mean Roughness | | |
|---|---|---|
| 0.013 | 0.4 | 12.5 |
| 0.025 | 0.8 | 25 |
| 0.05 | 1.6 | 50 |
| 0.1 | 3.2 | 100 |
| 0.2 | 6.3 | — |

Maximum Value Designation for Center-Line Mean Roughness In the case where the surface roughness is designated by the permissible maximum value for the center-line mean roughness, it shall be represented by the numerical value selected from the preferred number series of Table 2, suffixing a.

Remarks:
1. The permissible maximum value mentioned here shall be an arithmetic mean value of $R_a$ on several points randomly extracted from the indicated surface, but shall not be the maximum value of individual $R_a$ value.
2. The maximum value designation of the center-line mean roughness is 6.3 where "6.3 a" means 0 μm $R_a \leq 6.3$ a $\leq 6.3$ μm $R_a$.
3. For the cut-off value in the case of the maximum value designation of the center-line mean roughness, a value corresponding to the maximum value in Table 1 shall generally be used. When any cut-off value other than this value is to be used, this value shall be appended.

Sectional Designation for Center-Line Mean Roughness If it is required to designate a center-line mean roughness in a certain section, numerical values corresponding to the upper limit (that of the larger designation value) and a lower limit (that of the smaller designation value) shall be stated additionally by selecting from Table 2.

Example 1: In the Case where Standard Values of Cut-off Values for Upper Limit and Lower Limit (Table 1) Are Equal: A sectional designation when the upper limit of 6.3 μm $R_a$ and the lower limit of 1.6 μm $R_a$ shall be designated as (6.3 to 1.6) a. In this case, 0.8 mm shall be used for the cut-off value.

Example 2: In the Case where Standard Values of Cut-off Values for Upper Limit and Lower Limit (Table 1) Are Different: A sectional designation when the upper limit of 25 μm $R_a$ and the lower limit of 6.3 μm $R_a$ shall be designated as (25 to 6.3) a. In this case, it means that a center-line mean roughness measured by a cut-off value of 2.5 mm is 25 μm $R_a$ or under, and that a center-line mean roughness measured by a cut-off value of 0.8 mm is 6.3 μm $R_a$ or over.

Remarks:
1. In the case where it is required to equalize the cut-off values corresponding to the upper and lower limits, or in the case where cut-off values other than standard values of Table 1 is to be used, the cut-off value shall be appended. In the case of Example 2, when the cut-off value corresponding to the upper and the lower limits is taken as 2.5 mm, it shall be designated as (25 to 6.3) a λc 2.5 mm.

2. Center-line mean roughness of the upper and the lower limits mentioned here shall be the arithmetic mean values of $R_a$ at several points sampled randomly from the designated surface, but shall not be the maximum value of individual $R_a$ values.

(II) A heat-bondable film label comprising a plastic film layer, a print layer formed on the inner surface side of the plastic film layer, a hot-melt adhesive layer formed on the print layer and an overcoat layer of a release substance having a static friction coefficient smaller than 0.20, which is formed on the outer surface side of the plastic film layer.

(III) A label to be bonded to the outer surface of a polyolefin type plastic vessel by the in-mold labelling operation, which comprises a label substrate and an adhesive layer of chlorinated polypropylene formed on one surface of the substrate.

(IV) A label to be bonded to the outer surface of a polyolefin type plastic vessel by the in-molding labelling operation, which comprises a label substrate and an adhesive layer of a blend of chlorinated polypropylene and a copolymer of ethylene with a carbonyl group-containing ethylenic monomer, which is formed on the substrate on the surface to be bonded to the vessel.

(V) A label to be bonded to the outer surface of a polyolefin type plastic vessel by the in-mold labelling operation, which consists of a laminate comprising a transparent label substrate, a printing ink layer formed on the inner surface side of the label substrate and an adhesive layer of an ethylenic copolymer composed mainly of ethylene and containing an ethylenically unsaturated carboxylic acid or a derivative thereof as a comonomer, which is formed on the printing ink layer.

(VI) A label to be bonded to a polyolefin type plastic vessel by the in-mold labelling operation, which consists of a laminate comprising a transparent label substrate, a printing ink layer formed on the inner surface side of the label substrate, a primer layer composed of chlorinated polypropylene or a blend of chlorinated polypropylene and a copolymer of ethylene with a carbonyl group-containing ethylenic monomer, which is formed on the printing ink layer, and an adhesive layer of a copolymer composed mainly of ethylene and containing an ethylenically unsaturated carboxylic acid or a derivative thereof as a comonomer, which is formed on the primer layer.

The labels (I) and (II) are excellent in the heat bondability and separate supplying property, and the labels (III) through (VI) are excellent in the combination of the heat resistance and chemical resistance in the state bonded to a vessel.

BRIEF DESCRIPTION OF THE DRAWINGS

FIG. 1-A through 1-F are sectional views showing several examples of sectional structures in the label of the present invention.

FIG. 2, STEP A through STEP C are diagrams illustrating the in-mold labelling operation.

FIG. 6, STEP I through STEP III are schematic views illustrating the arrangement of a label-bonding mechanism.

DETAILED DESCRIPTION OF THE PREFERRED EMBODIMENTS

Figure 3:
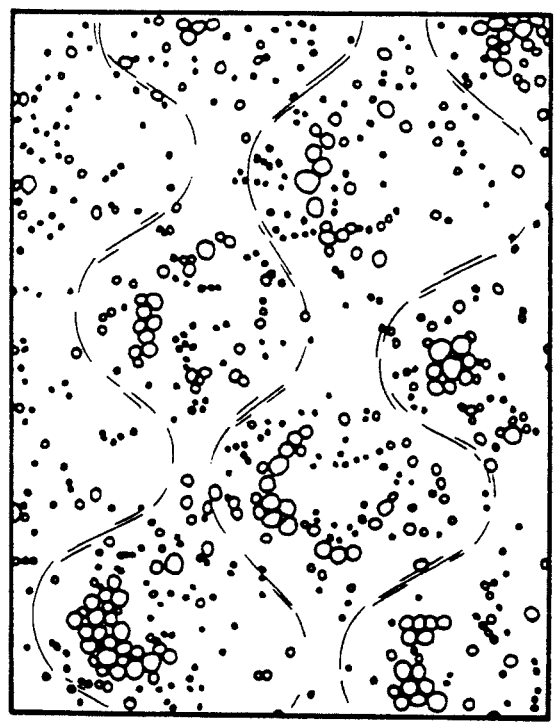
FIG. 3 is a diagram of the surface structure of the hot-melt adhesive of the label of the present invention, which is seen in the state magnified by a microscope.

In the preparation of a plastic formed vessel, a plastic sheet or parison in the molten or softened state is expanded in a mold by blowing a compressed fluid into the mold, the expanded plastic material is brought into contact with the cavity surface of the mold and cooled to form the plastic material into a vessel, and finally, the mold is opened and the formed vessel is taken out. In the in-mold labelling operation, a label is held on the inner surface of the cavity before the blow-molding of the sheet or parison, and the molten plastic sheet or parison being expanded is brought in contact with a label and heat bonding is advanced.

In principle, the present invention is based on the finding that in the above-mentioned in-mold labelling operation, if a label comprising as the substrate a drawn film of a plastic material having a heat shrinkage factor larger than the forming shrinkage factor of a plastic material constituting the outer surface of the vessel at a temperature ($T_1$) lower by 40° C. than the melting point or softening point of the plastic material constituting the outer surface of the vessel is used as the label to be bonded to the vessel, bulging or wrinkling is not caused on the outer surface of the label, and a labelled hollow vessel, which is excellent in adhesion between the vessel and label and also in peeling resistance, is obtained.

In the instant specification and appended claims, the melting point or softening point of the plastic material means the melting point in case of a plastic material having a clear melting point (crystalline polymer) and the softening point in case of a plastic material having no clear melting point.

It is believed that a film having an improved thermal dimension stability, for example, a drawn and heat-set film, will give satisfactory results as the plastic film to be subjected to a heat treatment. However, in the case where a label comprising this drawn and heat-set film as the substrate is bonded to a hollow-formed vessel by the in-mold labelling operation, wrinkling or bulging is caused on the outer surface of the label, resulting in degradation of the appearance characteristics, and the adhesion to the vessel and the peeling resistance are lower than those attained when a label is bonded outside the mold. The reason is that the density of the plastic material in the molten state is lower than that in the solid state at normal temperature, and therefore, the formed vessel considerably shrinks in the solid state at normal temperature from the volume at the time of bonding the label to the vessel (in the molten state).

In the present invention, by using a drawn plastic film having a heat shrinkage factor larger than the forming shrinkage factor of the plastic material constituting the outer surface of the vessel at the above-mentioned temperature $T_1$ as the substrate film of the label, it is possible to leave the heat shrinkability in the label so that the residual equilibrium shrinkage factor (RS) defined by the formula (1) is within a certain range, whereby it is made possible to keep the outer surface of the label smooth and improve the adhesion to the vessel.

Incidentally, the forming shrinkage factor of a plastic material is defined in ASTM D-955, and the heat shrinkage factor of a film can be determined according to JIS C-2318 (the heating temperature is $T_1$ and the heating time is 30 minutes). In general, the degree of heat shrinkage of a plastic film depends on the degree of molecular orientation and the degree of heat-setting of this orientation. Namely, in general, the higher is the degree of molecular orientation, the higher is the degree of heat shrinkage, and the higher is the degree of heat-setting of molecular orientation, the lower is the degree of heat shrinkage. Accordingly, by adjusting the degree of molecular orientation of a drawn film to be used for the label or by adjusting the degree of heat-setting of molecular orientation, the degree of heat shrinkage of the film can be adjusted within a desirable range.

According to one embodiment of the present invention, in order to impart a metallic gloss to the label and improve the decorative effect, a metal foil is used in combination with the drawn film as the label. In this embodiment, it is important that the metal is used in the form of a thin layer having a thickness 50 to 150000 Å, especially 100 to 90000 Å. If the thickness of the metal layer exceeds the upper limit as in case of an ordinary metal foil, the metal layer cannot follow the shrinkage of the film substrate, and bulging or wrinkling is readily caused in the bonded label. In contrast, according to the present invention, by reducing the thickness of the metal layer, the metal layer becomes capable of following the shrinkage of the substrate film, and occurrence of bulging or wrinkling can be prevented. However, if the thickness of the metal layer is smaller than the lower limit value, no metallic gloss can be obtained. Accordingly, it is preferred that the thickness of the metal layer be adjusted within the above-mentioned range. The metal layer may be a vacuum deposition layer or a very thin metal foil.

Fundamental examples of the label to be used in the present invention will now be described.

Referring to FIG. 1-A, this label 1 consists of a laminate comprising a drawn film plastic film substrate layer (outer layer) 2, a print layer 3 formed on the back side of the substrate layer 2 and a hot-melt adhesive resin layer 4 formed on the surface of the print layer 3. The plastic film substrate 2 is a monoaxially or biaxially drawn film having a heat shrinkage factor larger than the forming shrinkage factor of the plastic material constituting the outer surface of the vessel at a temperature ($T_1$) lower by 40° C. than the melting point or softening point of the plastic material constituting the outer surface of the vessel. The hot-melt adhesive is heat-bonded to the plastic material being formed by the blow-forming.

Referring to FIG. 1-B illustrating another example of the laminate label to be used in the present invention, this label 1 consists of a laminate comprising a drawn plastic film substrate layer (outer layer) 2 as mentioned above, a printing ink layer 3 formed on the back side of the substrate later 2, a thin metal foil 5 and a thermoplastic adhesive layer 4. This label 1 is formed by bonding a metal foil to a printed drawn plastic film through a known adhesive or adhesive primer in such a positional relationship that the printing ink layer confronts the metal foil, and coating a thermoplastic adhesive on the metal foil.

Referring to FIG. 1-C illustrating still another example of the laminate label, this label 1 consists of a laminate comprising a drawn plastic film outer layer 2, a printing ink layer 3 formed on the back side of the drawn plastic film outer layer 2, a drawn plastic film intermediate layer 2a having a vacuum deposition metal layer 5a formed on the surface thereof, and a thermoplastic adhesive inner layer 4. Both the plastic films 2 and 2a should have the above-mentioned characteristics. By vacuum-depositing a metal on the drawn plastic film, the thickness of the metal layer can be sufficiently reduced within the range providing a metalic gloss. This label 1 is formed by bonding a printed drawn plastic film and a metal-vacuum-deposited drawn plastic to each other through an adhesive or an adhesive primer in such a positional relationship that the printing ink layer confronts the metal vacuum deposition layer, and coating a thermoplastic adhesive on the surface on the metal-vacuum-deposite film side.

The laminate label may have a lamination structure as shown in FIG. 1-D. The label 1 shown in FIG. 1-D consists of a laminate comprising a drawn plastic film outer layer 2, a printing layer 3 formed on the back side of the drawn plastic outer layer 2, a drawn plastic film intermediate layer 2a having vacuum deposition metal layer 5a formed thereon, and a hot-melt adhesive inner layer 4. Both the drawn plastic films 2 and 2a should have the above-mentioned characteristics. This label 1 is formed by bonding a printed drawn plastic film and a metal-vacuum-deposited plastic film to each other through an adhesive in such a positional relationship that the printing ink layer confronts the drawn film, and coating an adhesive primer on the vacuum deposition metal layer and coating a thermoplastic adhesive on the adhesive primer.

Referring to FIG. 2 illustrating the in-mold labelling operation, at the step A, split blow molds 10a and 10b are in the open state before the blow-forming of a plastic parison and a label 1 is attached to the cavity surface 11 of at least one of the split molds 10a and 10b in advance. Namely, a portion supporting the label 1 is formed on the cavity surface 11, and a reduced pressure suction mechanism 12 is arranged on this portion and the label 1 is held on the cavity surface 11 by suction. In this case, the label 1 is arranged so that the plastic film substrate 2 is located on the outer side and the hot-melt adhesive resin layer 4 is located on the inner side. The means for application and fixation of the label 1 to the cavity surface 11 is not limited to the above-mentioned suction, but the application and fixation can also be accomplished by static electricity.

At the step B, a molten plastic parison 14 is extruded from a die 13, and the split blow molds 10a and 10b are closed and a compressed gas is blown into the closed parison 14.

At the step C, the parison expanded in the mold is held by the surface of the mold and pressed to the label 1, whereby adhesion and bonding are accomplished between the parison and label. Simultaneously, the expanded parison is brought into contact with the surface of the mold and cooled to obtain a labelled vessel.

The blow-forming is carried out not only according to the direct blowing method using a horizontal rotary blow-forming machine or a vertical rotary blow-forming machine but also according to other optional blow-forming method such as an injection blow-forming method, a two-staged blow-forming method, a sheet forming method or a stretch-blow-molding method.

As the plastic material constituting the vessel and label substrate film, there can be mentioned thermoplastic resins, for example, polyolefins such as crystalline polypropylene, a crystalline propylene/ethylene copolymer, crystalline polybutene-1, crystalline poly-4-methylpentene-1, low-density polyethylene, medium-density polyethylene and high-density polyethylene, aromatic vinyl polymers such as polystyrene and a styrene/butadiene copolymer, vinyl halide polymers such as polyvinyl chloride and a vinylidene chloride resin, nitrile polymers such as an acrylonitrile/styrene copolymer and an acrylonitrile/styrene/butadiene copolymer, polyamides such as nylon 6, nylon 6,6, poly-p-xylylene adipamide and poly-m-xylylene adipamide, polyesters such as polyethylene terephthalate and poly-tetramethylene terephthalate, polycarbonates, and polyacetals such as polyoxymethylene.

The hollow formed vessel can have a single-layer or multiple-layer structure. For example, there can be mentioned a vessel composed of a single layer of a polyolefin or polyethylene terephthalate, and a multiple-layer vessel comprising inner and outer layers of a polyolefin or polyethylene terephthalate and an intermediate layer of a gas-barrier thermoplastic resin. As the gas-barrier resin, there can be used an ethylene/vinyl alcohol copolymer having an ethylene content of 50 to 20 mole %, a xylene group-containing polyamide, a gas-barrier polyester, a polymer having a high nitrile group content, a vinylidene chloride resin and other known gas-barrier resins. If there is no adhesiveness between the inner and outer layers and the intermediate layer, an adhesive resin such as an acid-modified olefin resin, a copolyamide or a copolyester may be interposed between the outer and inner layers and the intermediate layer.

Forming shrinkage factors (ASTM D-955) of various resins constituting hollow vessels are shown in Table 1.

TABLE 1

| Resin | Heat Shrinkage Factor (%) |
| --- | --- |
| high-density polyethylene | 2 to 5 |
| low-density polyethylene | 1.5 to 3.5 |
| polypropylene | 0.6 to 3.0 |
| styrene resin | 0.1 to 0.8 |
| polyethylene terephthalate | 0.2 to 0.9 |
| polycarbonate | 0.5 to 0.7 |
| polyamide (nylon 6,6) | 0.4 to 2.2 |
| polyacetal | 2.5 to 3.0 |
| vinyl chloride resin | 0.1 to 5 |
| vinylidene chloride resin | 0.5 to 2.5 |

The drawn film to be used as the label is formed of a thermoplastic resin as mentioned above. The kind of the resin and the drawing degree are determined so that the heat shrinkage of the resin of the drawn film at the temperature $T_1$ is larger than the forming shrinkage factor shown in Table 1, preferably the residual equilibrium shrinkage factor (Rs) represented by the formula (1) is within the above-mentioned range. The drawn film may be an unfoamed transparent film or a lightly foamed drawn film having a blow ratio of 1.1 to 1.9, especially 1.3 to 1.7. The thickness of the drawn film is generally 20 to 300 μm and preferably 50 to 150 μm.

It is generally preferred that the drawn film substrate be heat-bonded to the plastic material of the outer wall of the vessel through a hot-melt adhesive, though this heat bonding is not particularly necessary if a sufficient heat-bonding force is directly obtained between the drawn film used for the label and the plastic material of the outer surface of the vessel at the hollow-forming step. As the hot-melt adhesive resin, there can be used an ethylene/vinyl acetate copolymer (EVA) having a vinyl acetate content of 5 to 40% by weight, chlorinated polypropylene, an ethylene/ethyl acrylate copolymer (EEA) having an acrylic acid content of 5 to 40% by weight, low-density polyethylene, other ethylene resins, and resin compositions formed by incorporating 5 to 30% by weight of a tackifier such as a rosin, terpene, petroleum or styrene resin into the above-mentioned ethylene resins. It is preferred that the hot-melt adhesive resin layer be formed in a thickness of 0.1 to 40 μm, especially 0.3 to 15 μm, on the substrate film.

Generally, a print layer is formed on the outer or inner side of the drawn film to be used for the label. A known ink can be used for formation of the print. For example, there can be used an ink comprising a polyester urethane, vinyl urethane, epoxy vinyl, epoxy acrylic or chlorinated polypropylene resin as a vehicle and a colorant. In the case where a transparent portion is required for the reason of design, in order to improve the adhesion of the substrate film to the adhesive layer, a layer composed solely of a vehicle as mentioned above can be additionally formed. In the case where printing is accomplished by an offset printing method, a gravure printing method, a letterpress printing method, an electrophotographic printing method or a hot-stamping method, a metallic gloss layer can be formed on the drawn film to be used for the label by using a material formed by vacuum-depositing aluminum on a polyester film substrate.

In the case where the metal layer is formed, a foil or vacuum deposition layer of a metal having a metallic gloss, such as aluminum, tin or copper, is used. A foil having a thickness of 1 to 15 μm, especially 5 to 9 μm, is used, or a vacuum deposition metal layer having a thickness smaller than the above-mentioned thickness of the foil is used. Bonding of the metal foil to the printed drawn film and bonding of the vacuum deposition metal film to the printed drawn film substrate is accomplished by using a urethane adhesive or epoxy adhesive, or by using an acid-modified olefin resin type adhesive in some film substrates.

The process of the present invention is especially effective when the in-mold labelling operation is carried out for a hollow vessel, the outer surface of which is composed of an olefin resin such as polypropylene. In this case, it is preferred that a drawn film of an olefin resin such as polypropylene be used as the drawn film substrate of the label.

In preparing a labelled hollow vessel by the in-mold labelling operation, according to the present invention, by using a label comprising a substrate of a drawn film having a specific heat shrinkability, a certain equilibrium shrinkage factor can be left in the bonded label, whereby occurrence of wrinkling or bulging can be prevented and the appearance characteristics can be improved. Moreover, it becomes possible to improve the adhesion of the label to the outer surface of the vessel and the peeling resistance of the label.

Furthermore, by carrying out the in-mold labelling operation, the adhesive-coating operation and label-bonding operation can be omitted, and it becomes possible to rationalize the vessel-preparing process.

In accordance with a preferred embodiment of the present invention, a heat-bondable label is used, a large number of such labels are contained in a magazine, the magazine is taken out from the magazine and held by suction, and the magazine is transferred into the mold and attached to the mold surface.

The label to be used comprises a plastic film layer, a print layer formed on the inner surface side of the plastic film layer, a hot-melt adhesive layer formed on the print layer, and according to need, an overcoat layer formed on the outer surface side of the plastic film layer. In this embodiment, resin and/or inorganic beads having a particle size of 0.1 to 100 μm, especially 10 to 70 μm, are incorporated into any one of the above-mentioned print layer, hot-melt adhesive layer and overcoat layer, and the center line average height (JIS B-601) of any one of the surfaces is adjusted within the range of 0.2 to 50 μm, especially 0.3 to 20 μm. By dint of these prominent features, sticking or blocking of labels in the piled state can be prevented without degradation of excellent heat bondability, smoothness and decorative effect inherently possessed by the heat-bondable film label and separate supply of labels one by one can be performed assuredly, and in the in-mold labelling operation, good bonding can be attained between the label and the side wall portion of the vessel being formed by dint of the anchoring effect of the above-mentioned beads.

Figure 4:
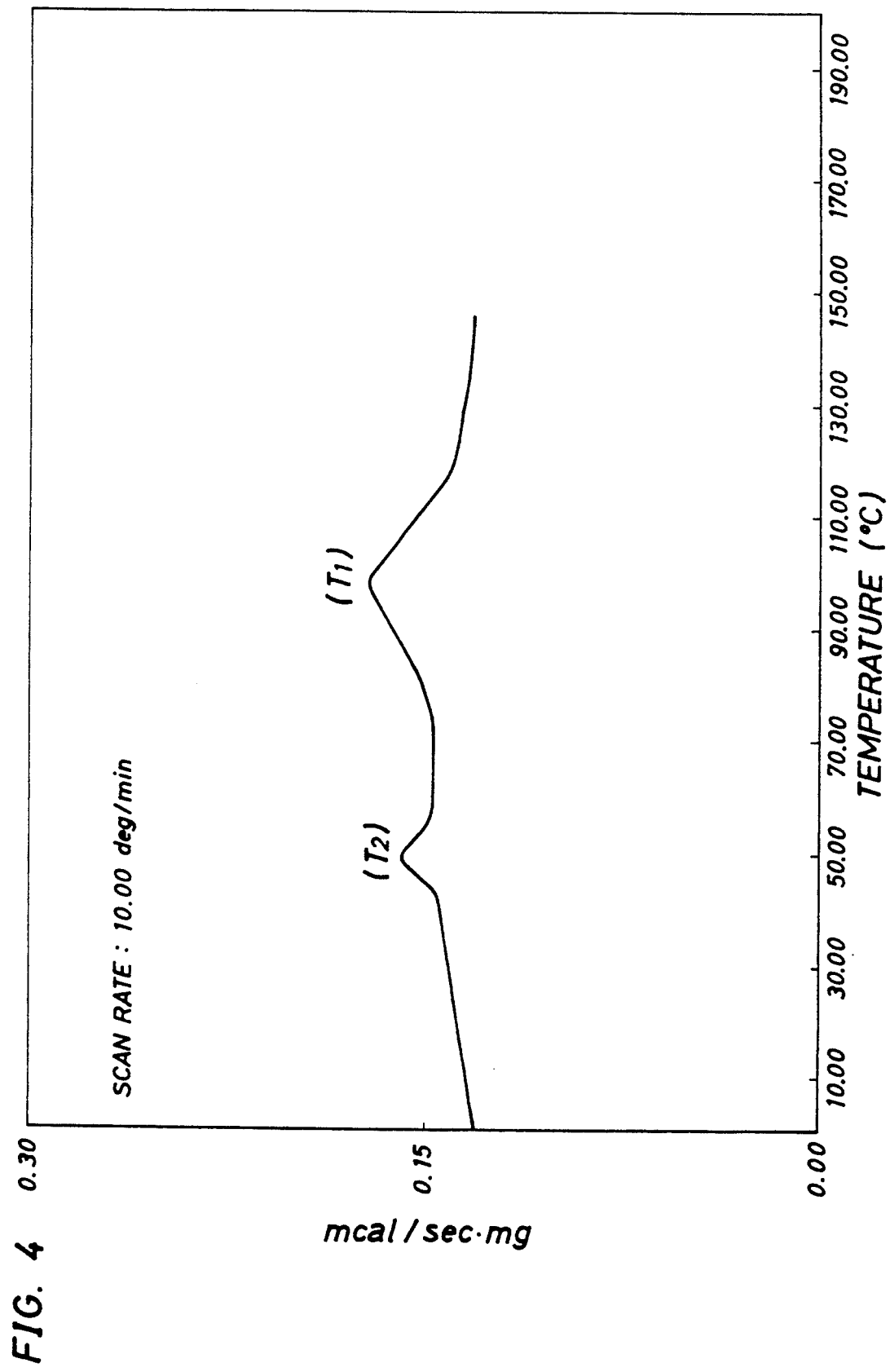
FIG. 4 is a differential scanning calorimater (DSC) curve of chlorinated polypropylene used as the adhesive in the present invention.

The bead used in the present invention is a so-called spherical filler different from an ordinary filler, and respective particles have independently a clear spherical particle shape (no agglomeration) and have a large particle size and a sharp particle size distribution. If this bead is incorporated in a coating composition and the coating composition is coated on a film, a projection is formed on the surface in the bead-containing portion. In this projection, the bead is exposed to the surface or the surface of the bead is covered with the hot-melt adhesive resin or overcoat resin. At any rate, a course surface corresponding to the above-mentioned center line height is formed. FIG. 4 of the accompanying drawings shows the surface structure of the hot-melt adhesive of the heat-bondable film label of the present invention in the magnified state, and in FIG. 4, the background indicates the hot-melt adhesive resin and small circles indicate beads. From FIG. 4, it is understood that surface projections based on the beads are formed.

According to the present invention, the projecting or roughened portion is formed on the surface of the heat-bondable film surface, and a sufficient clearance is formed between the surfaces of piled labels and sticking of labels with no clearance can be prevented and even if the surface of the hot-melt adhesive becomes tacky to some extent by environmental changes, sticking of labels can be prevented. Furthermore, since the beads used in the present invention are spherical particles and have a smallest surface area per unit volume, the adaptability of the hot-melt adhesive to the coating operation is not degraded, and in the in-mold labelling operation, an anchoring action is manifested between the label and the side wall portion of the plastic vessel being formed, whereby excellent bonding can be attained.

In order to prevent blocking and increase the anchoring effect and heat bondability, it is important that the particle size of the beads should be within the above-mentioned range. If the particle size is too small and below the above-mentioned range, no substantial blocking-preventing effect is attained and the anchoring effect is small. If the particle size is too large and exceeds the above-mentioned range, the heat bondability is poor and reduction of the smoothness is often caused in the label.

Beads having a solid structure can be used in the present invention, but in order to form a projecting surface or roughened surface effectively with a small amount of beads, it is preferred that beads having a hollow structure or foamed structure be used. From the same viewpoint, it also is preferred that beads having an apparent density of 0.01 to 2.0 g/cc, especially 0.01 to 1.7 g/cc, be used.

It is preferred that the content of beads be 3 to 40% by weight based on the coating composition (the entire hot-melt adhesive). If the content of beads is too low and below the above-mentioned range, the blocking-preventing effect and anchoring effect are insufficient. If the content of beads is too high and exceeds the above-mentioned range, the heat bondability is degraded.

The bead-containing adhesive layer can be formed in a relatively uniform thickness on the substrate film of the label. In view of the blocking-preventing effect and anchoring effect, it is preferred that a certain pattern of projections by the beads be formed. In this cell pattern, the number of lines is preferably 10 to 150 per inch (2.5 cm) and especially preferably 15 to 100 per inch (2.5 cm). This cell can be formed by using a gravure roll or screen for coating of the adhesive layer.

In the present invention, beads described hereinafter are incorporated in any one of the print layer 3 and the hot-melt adhesive layer 4, preferably in the adhesive layer 4, in the label 1 shown in FIG. 1-A or the like.

Referring in FIG. 1-E illustrating another example of the heat-bondable film label of this type, the label 1 comprises a film substrate 2, a print layer 3 and a hot-melt adhesive layer 4 as in case of the label shown in FIG. 1-A, and an overcoat layer 6 is further formed on the outer surface of the film substrate 2. Resin and/or inorganic beads can be incorporated into the overcoat layer 6.

The beads of the present invention are composed of a thermoplastic resin, a thermosetting resin or an inorganic substance such as ceramics, glass or silica, and the beads have the above-mentioned particle size and preferably the above-mentioned apparent density. It is generally preferred that the beads should have a hollow or foamed structure.

Hollow or foamed beads of various resins can be obtained by preparing foamable fine particles of a resin by an encapsulating technique, foaming the foamable fine particles by steam, hot water or hot air, and drying the foamed beads according to need. The particulate structure may be a single-capsule structure, a multiple-nucleus capsule structure or a capsule cluster structure. As preferred examples of the thermoplastic resin, there can be mentioned polyolefins such as polyethylene and polypropylene, polystyrene and a stylene copolymer, an acrylic resin such as an acrylate/acrylonitrile copolymer, a vinylidene chloride or vinyl chloride copolymer, and polyamides. As preferred examples of the thermosetting resin, there can be mentioned a phenolic resin, a urea resin and an epoxy resin.

As the inorganic beads, there can be mentioned beads formed by heating and foaming a mineral, such as foamed perlite beads and foamed beads, capsules having a glass wall, such as glass balloons, and ceramic glass capsule clusters (spheres containing independent fine cells). Furthermore, there can be used spherical silica hollow bodies, spherical carbon hollow bodies and various spherical ceramic hollow bodies.

These beads can be used singly or in the form of a mixture of two or more kinds of them. For example, resin beads and inorganic beads can be used in combination.

In the present invention, beads are dispersed in a solution or aqueous dispersion of a hot-melt adhesive to form a coating composition, the coating composition is supplied to a gravure roll having a cell pattern formed on the surface, and the coating composition is applied to a label. As the cell pattern, there can be mentioned a pyramid type cell pattern, a lattice type cell pattern, a trapezoid type cell pattern, an inclined line type cell pattern and a tortoise-shell type cell pattern. A similar cell pattern can also be formed by carrying out the coating through a screen.

Figure 5:
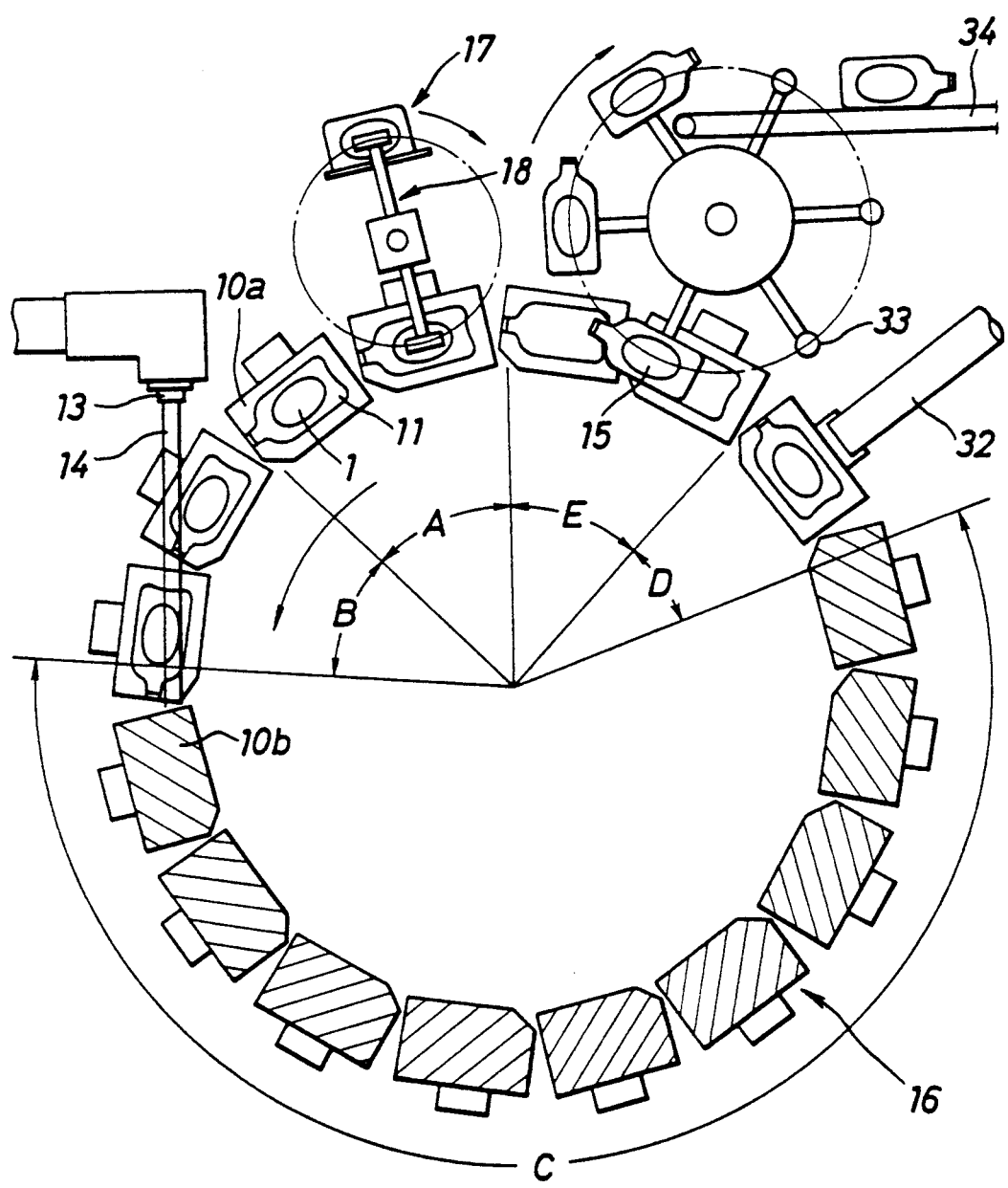
FIG. 5 is a schematic view illustrating the arrangement of an apparatus for use in preparing the labelled plastic vessel of the present invention.

Referring to FIG. 5 illustrating diagrammatically the arrangement of the labelled plastic vessel of the present invention, many split blow molds 10a and 10b are arranged around a turret 16 so that the split blow molds can rotate with the axis of the turret 16 being as the center. A label-attaching zone A, a parison extrusion zone B, a blow-forming and cooling zone C, a flash recovery zone D and a bottle take-out zone E are arranged in this order along the circular moving path. For facilitating the understanding, one 10a of the paired split blow molds 10a and 10b is shown in the label-attaching zone A, parison extrusion zone B, flash recovery zone D and bottle take-out zone E. The split molds 10a and 10b have a cavity surface 11 having a dimension and shape corresponding to the outer surface of a vessel (bottle) to be formed. The parting faces of the split blow molds 10a and 10b are parallel to the plane of FIG. 5 and can be opened and closed orthogonally to this plane. The split molds 10a and 10b are provided with a cam 23 for controlling the label-attaching operation.

In the label-attaching zone A, the split molds 10a and 10b are in the open state, and a label magazine 17 and a label-attaching mechanism indicated entirely by reference numeral 18 are arranged in the zone A. As shown in detail in FIG. 6, the label magazine 17a, 17b comprises a cylindrical container 19 for containing a label 1 therein, a label take-out portion 20 located at one end of the cylindrical container 20 and a spring member 21 arranged at the other end of the cylindrical container to press the label. Many labels 1 are contained in the piled (stacked) state in the container 19. A pawl member (separating pawl) 22 is arranged in the label take-out portion 20 to make it possible to take out labels one by one. In the present embodiment, a pair of label magazines are arranged to bond labels to the front face and back face of the vessel.

The label-attaching mechanism 18 comprises an attracting cap 24 for attracting and holding the label 1 by vacuum suction, an arm 25 for supporting the attracting cap 24, a horizontally reciprocating mechanism 26 for reciprocating the arm 25 in the horizontal direction and a mechanism 28 for turning and driving the arm 25 around a shaft 27. More specifically, the arm 25 supports the attracting cap 24 on the top end in the radial direction and the central side end portion of the arm 25 in the radial direction is slidably connected to a sliding projection member 29 capable of sliding along the shaft 27. The sliding projection member 29 can be engaged with the terminal end of a cam follower 31 at an upper position in FIG. 6 and can be engaged with a cam 23 at a lower position in FIG. 6. The mechanism 26 for reciprocating the sliding member 29 in the horizontal direction comprises a cam 30 and a cam follower 31 and is arranged so that when the cam follower 31 moves toward the arm 25, the arm 25 swings to move the attracting cap 24 to the opposite side (outer side).

In the embodiment shown in FIG. 6, pairs of the arms 21 and attracting caps 24 are arranged symmetrically at an angle of 180° with respect to the shaft 27 and plane-symmetrically with respect to the rectangular plane of the shaft 27. In the embodiment shown in FIG. 6, when the attracting cap 24 located at the upper position is engaged with the label magazine 17a, 18b, the attracting cap 24 at the lower position are engaged with the split molds 10a and 10b.

At the stroke I in FIG. 6, the attracting cap 24 at the upper position does not retain the label 1, while the attracting cap 24 at the lower position holds the label 1. These attracting caps 24 are located at positions retreating from the label magazines 17a and 17b and the split molds 10a and 10b. At this stroke I, the split molds do not arrive at the label-attaching zone A yet. Then, the split molds 10a and 10b arrive at the label-attaching zone A and the sliding projecting member 29 at the lower position falls in engagement with the cam 23. In this state the cam 30 for the horizontal reciprocal motion is driven, and the attracting cap 24 at the upper position moves to the label magazines 17a and 17b and the attracting cap 24 at the lower position is driven and advanced toward the split molds 10a and 10b by the label-attaching cam 23. At the stroke II shown in FIG. 6, the attracting cap 24 at the upper position falls in contact with the label 1 contained in the label magazines 17a and 17b, while the attracting cap 24 at the lower position bonds the label 1 held therein to the cavity surface 11 of the split molds 10a and 10b. Incidentally, in the embodiment shown in FIG. 6, the split molds 10a and 10b are caused to make a closing motion by a predetermined distance by the cam mechanism 23, whereby attachment of the label 1 to the cavity surface 11 can be smoothly performed. At the stroke II shown in FIG. 6, vacuum is cut in the attracting cap 24 at the lower position, and the label 1 is released and is held by the attracting mechanism (suction mechanism 12 in FIG. 2) arranged within the split molds 10a and 10b. Then, the cam 30 for the horizontal reciprocal motion and the attaching cam 23 are driven to retreat the respective attracting caps 24 to the positions of the stroke III shown in FIG. 6. The shaft 27 turns by 180° from the position of the stroke III, and the attracting cap 24 holding the label 1 thereon arrives at the stroke I shown in FIG. 6. Then, the above-mentioned stroke procedures are repeated in the same manner.

Referring to FIG. 5 again, in the parison extrusion zone B, the molten plastic parison 14 is extruded from the die 13. The split molds 10a and 10b are closed and the bottom portion is formed in the parison 14 by the inch-off operation, and a fluid is blown into the interior of the parison 14. Thus, the parison 14 is formed into a labelled plastic vessel 15 in the blow-forming and cooling zone C. In the flash recovery zone D, the split molds 10a and 10b are opened, and the flash is discharged in a flash recovery chute 32. In the bottle take-out zone E, the labelled bottle 15 is taken out from the molds 10a and 10b by bottle gripper 33 and discharged into a delivery mechanism 34.

According to the present embodiment, it is possible to supply and attach labels one by one to the cavity surface of split molds assuredly, and therefore, labelled plastic vessels can be prepared at a high productivity by the in-mold labelling operation. Furthermore, this label is excellent in the adhesion to the side wall portion of the vessel, and dropping of the label can be prevented even under severe conditions.

In accordance with another preferred embodiment of the present invention, as shown in FIG. 1-E, an overcoat layer 6 is formed on the outer surface side of the film substrate 2 to protect the plastic film and improve the touch and appearance characteristics of the surface of the label. In the present invention, the functions of preventing blocking owing to the stickiness of the label and rendering the outer surface of the label slippery are given to the overcoat layer 6.

More specifically, the present embodiment is prominently characterized in that an overcoat layer of a release substance having a static friction coefficient smaller than 0.20, especially smaller than 0.15, is formed on the outer surface side of the plastic film layer, and by dint of this overcoat layer, sticking or blocking of labels in the piled state can be eliminated without degradation of excellent heat bondability, smoothness and decorative effect inherently possessed by the heat-bondable film label, and the labels can be supplied separately one by one assuredly.

The reason is considered to be that by arranging a release substance in the form of an overcoat layer on the outer surface side of the plastic film layer, the lubricating property of the surface of the heat-bondable film label is increased and the slip of the film is improved. Accordingly, even if the heat-bondable film label has a sticking or blocking tendency, by dint of this improved slip, when labels are attracted by vacuum suction, the labels can be supplied one by one.

In the present embodiment, it is important the static friction coefficient of the release substance should be smaller than the above-mentioned critical value. In the case where the static friction coefficient is larger than the above-mentioned critical value, if the stickness is somewhat increased in the surface of the hot-melt adhesive layer in the heat-bondable film label by environmental changes, it becomes difficult to impart a lubricating property overcoming this increased stickness to the outer surface of the label, and because of mutual adhesion among labels, it becomes difficult to supply the labels one by one assuredly even if the labels are attracted by vacuum suction.

As the release substance to be used for the overcoat layer in the present invention, there can be mentioned a fluorin resin, a melamine resin, a silicone resin, paraffin, chlorinated paraffin, higher alcohols such as stearyl alcohol and cetyl alcohol, fatty acids such as stearic acid and oleic acid, fatty acid salts, fatty acid esters, polypropylene, ethers such as a glycol alkyl ether, fatty acid amides, graphite and molybdenum sulfide. It is important that the overcoat layer of the release substance should be formed in a thickness of 0.01 to 50 μm, preferably 0.1 to 10 μm.

If the thickness of the overcoat layer is too small and below the above-mentioned range, it is difficult to obtain the above-mentioned static friction coefficient, though the static friction coefficient is influenced to some extent by the viscosity of the release substance. If the thickness of the overcoat layer is too large and exceeds the above-mentioned range, a sharp image cannot be obtained from the outer surface.

In the present invention, in order to prevent migration of the release substance present on the label surface to the adhesive layer of another label and subsequent reduction of the adhesive force, it is preferred that the overcoat layer be composed of a release resin, and a silicone resin, a fluorine resin and a melamine resin is preferably used. Furthermore, a release resin formed by mixing the above-mentioned release substance with 0.1 to 50% by weight, especially 1 to 30% by weight, of nitrocellulose, a vinyl chloride/vinyl acetate copolymer, an acrylic resin, a polyester-urethane, a polyvinyl-urethane, a polyvinyl chloride-urethane or a polyamide is preferably used. Moreover, an inorganic filler such as silica can be incorporated into the release resin. The overcoat layer is formed by gravure coating, spray coating, comma coating, roll reverse coating or dip coating.

The static friction coefficient of the overcoat is measured according to the test method for determining the friction coefficient of a plastic film or sheet (JIS K-7125), and the measurement is carried out in the state where the overcoat layer of the label is contacted with the overcoat layer of another label.

According to this embodiment of the present invention, the lubricating property of the surface of the heat-bondable film label is improved, and even if the stickiness of the label is increased by the use of the hot-melt adhesive and the label shows a blocking tendency, mutual slip is attained between two adjacent labels by the presence of the overcoat layer, and in the in-mold labelling operation, labels can be assuredly supplied and bonded one by one to the cavity surface of the split molds. Furthermore, a labelled plastic vessel having an excellent label/vessel integrality, showing a good delivery characteristic because of a small friction coefficient of the label surface and having a high scratch resistance can be manufactured at a high productivity by the in-mold labelling operation.

In accordance with still another embodiment of the present invention, chlorinated polypropylene is used as the adhesive 4 in labels 1 for the in-mold labelling operation, as shown in FIGS. 1-A through 1-E. According to this embodiment, a high adhesion of the label to a to this embodiment, a high adhesion of the label to a polyolefin type plastic vessel being formed in the mold is attained, and the formed bonded portion has a heat resistance sufficient to resist hot filling of the content and even if a cosmetic, toiletry product or chemical adheres to the labelled vessel, an excellent chemical resistance is manifested.

The chlorinated polypropylene used in the present invention comprises polypropylene as the basic skeleton and some of hydrogen atoms are substituted with chlorine atoms. By this substitution with chlorine atoms, a polarity is given to the polymer. Accordingly, the chlorinated polypropylene is different from ordinary polypropylene in that the chlorinated polypropylene is soluble in solvents such as aromatic hydrocarbons, and the chlorinated polypropylene is characterized in that a film can be easily prepared from a solvent solution of the chlorinated polypropylene and the formed film can be easily heat-bonded to various polyolefin plastics such as polyethylene, polypropylene and a propylene/ethylene copolymer.

The fact that chlorinated polypropylene has an excellent heat bondability in the mold to a polyolefin type plastic vessel and gives a bonding having a heat resistance sufficient to resist the hot filling of the content was found as a phenomenon, and this phenomenon has not been theoretically elucidated sufficiently but it is estimated that this phenomenon will probably be due to the following mechanism.

More specifically, in order to perform heat bonding in the mold effectively, it is necessary that heat bonding of an adhesive layer to a high-temperature molten resin being formed should be completed by a short-time contact, that is, melting of the adhesive layer should be effected with a relatively small quantity of heat. In order to impart a heat resistance sufficient to resist the hot filling to the formed heat-bonded portion, it is indispensable that the adhesive layer should not substantially be molten at the hot filling temperature. In the chlorinated polypropylene used in the present invention, the crystallinity of polypropylene is reduced by chlorination, resulting in decrease of the melting heat quantity of crystals, but a relatively high crystal-melting temperature inherent to polypropylene is maintained. Therefore, it is estimated that the above-mentioned requirements can simultaneously be satisfied.

Moreover, it is estimated that since this chlorinated polypropylene has the above-mentioned crystal structure, the chlorinated polypropylene has a much higher chemical resistance than the heretofor used ethylene/vinyl acetate copolymer.

It is preferred that the chlorine content of the chlorinated polypropylene used in the present invention be 10 to 50% by weight, especially 20 to 40% by weight. It also is preferred that the crystal-melting peak temperature ($T_1$) of the chlorinated polypropylene measured by a differential scanning calorimater be 130° to 85° C., especially 115° to 85° C., and the crystal-melting heat quantity (C) of the chlorinated polypropylene be 0.5 to 10 cal/g, especially 1 to 5 cal/g.

If the chlorine content is too low and below the above-mentioned range, the solubility is reduced to render the film-forming operation difficult and the crystal-melting heat quantity is increased beyond the above-mentioned range, with the result that the strength of bonding attained by the in-mold labelling operation tends to decrease. If the chlorine content is too high and exceeds the above-mentioned range, the polarity of the adhesive is too high and the bondability to the polyolefin type plastic material is reduced. If the peak temperature (T) is too high and exceeds the above-mentioned range, the bondability (at the in-mold labelling operation) to the polyolefin type plastic material is reduced, and if the peak temperature (T) is too low and below the above-mentioned range, the heat resistance is degraded. If the heat quantity (C) is too large and exceeds the above-mentioned range, the heat bondability at the in-mold labelling operation is not satisfactory, and if the heat quantity (C) is too small and below the above-mentioned range, the heat resistance is insufficient.

FIG. 4 shows a DSC curve of the chlorinated polypropylene to be used in the present invention.

The chlorinated polypropylene to be used in the present invention is soluble in an aromatic hydrocarbon such as toluene, ethylbenzene or xylene, a halogenated hydrocarbon such as trichloroethylene, tetrachloroethylene or methylchloroform, or an alicyclic hydrocarbon such as cyclohexane, methylcyclohexane or ethylcyclohexane, and if a solution of the chlorinated polyethylene in a solvent as mentioned above is coated and dried, an adhesive film layer is formed. It is preferred that the viscosity of the chlorinated polypropylene be 0.1 to 200 P, especially 1 to 50 P, as measured at 25° C. with respect to a toluene solution having a concentration of 15 g/100 ml. It is preferred that the thickness of the adhesive layer be 0.1 to 50 μm, especially 1 to 10 μm.

Various additives such as a tackifier, a heat stabilizer, a lubricant, a plasticizer and a filler can be incorporated in the adhesive layer of the present invention. As the tackifier, there can be used a rosin type resin, a terpene resin, a petroleum resin, a styrene resin and a cumarone-indene resin. A metal soap type stabilizer and an organic tin type stabilizer can be used as the heat stabilizer, and an epoxy type lubricant and a wax type lubricant can be used as the lubricant. As the plasticizer, there can be used dioctyl phthalate, a fatty acid monoglyceride and a fatty acid diglyceride.

According to the present invention, by using chlorinated polypropylene as the adhesive for a label to be used for the in-mold labelling operation, excellent bonding of the label to a polyolefin type plastic vessel formed in the mold can be attained, and furthermore, the formed bonded portion has a heat resistance sufficient to the hot filling of the content and a very high chemical resistance is manifested even when a cosmetic, toiletery product or chemical adheres to the vessel.

In the present invention, a blend of chlorinated polypropylene and a copolymer of ethylene with a carbonyl group-containing ethylene monomer can be used as the adhesive layer in the labels shown in FIGS. 1-A through 1-E. The copolymer of ethylene with a car-bonyl group-containing ethylene monomer (hereinafter referred to as "ethylene/carbonyl-ethylene copolymer") is characterized in that the copolymer has an excellent adhesion to a coated surface or a printed surface. The reason why the blend of chlorinated polypropylene and the ethylene/carbonyl-ethylene copolymer has not only an excellent heat-bondability to a polyolefin type plastic vessel being formed in the mold but also an excellent chemical resistance is considered to be as follows.

For the heat-bondable label to be bonded to a vessel by the in-mold labelling operation, it is indispensable that heat bonding should be accomplished by a short-time contact while utilizing heat of the wall of the plastic vessel being formed. Since the ethylene/carbonyl-ethylene copolymer has a relatively low melting point, initial bonding of the label to the vessel is accomplished by heat of the vessel wall, and by utilization of reduction of the crystallinity in the chlorinated polypropylene by chlorination of polypropylene and also by maintenance of a relatively high crystal-melting temperature inherently possessed by polypropylene, secondary bonding become possible between the label and the vessel, whereby the label is assuredly bonded to the vessel by heat of the vessel wall. Furthermore, since the ethylene/carbonyl ethylene copolymer is kept molten for a relatively long time, the wettability of the adhesive to the vessel surface is improved and no die line is left. Moreover, since this chlorinated polypropylene has the above-mentioned crystal structure and is blended with the ethylene/carbonyl-ethylene copolymer higher bonding not attainable by the single use of these resins can be attained, and therefore, peeling of the label and reduction of the bonding force by liquid dripping of a shampoo or cosmetic can be prevented, whereby a high chemical resistance is attained.

A copolymer of ethylene with an ethylenically unsaturated monomer having a carbonyl

group derived from a carboxylic acid, a carboxylic anhydride, a carboxylic acid ester, a carboxylic acid amide or imide, an aldehyde or a ketone is used as the ethylene/carbonyl-ethylene copolymer in the present invention.

Preferred examples of the carbonyl group-containing ethylenically unsaturated monomer will now be described, though monomers that can be used are not limited to those exemplified below.

A. Ethylenically unsaturated carboxylic acids such as acrylic acid, methacrylic acid, maleic acid, fumaric acid, crotonic acid, itaconic acid, citraconic acid and 5-norbornene-2,3-dicarboxylic acid.
B. Ethylenically unsaturated carboxylic anhydrides such as maleic anhydride, citraconic anhydrides 5-norbornene-2,3-dicarboxylic anhydride and tetrahydrophthalic anhydride.
C. Ethylenically unsaturated esters such as ethyl acrylate, methyl methacrylate, 2-ethylhexyl acrylate, monoethyl maleate, diethyl maleate, vinyl acetate, vinyl propionate, propyl γ-hydroxymethacrylate, ethyl β-hydroxyacrylate, glycidyl acrylate and glycidyl methacrylate.
D. Ethylenically unsaturated amides and imides such as acrylamide, methacrylamide and maleimide.
E. Ethylenically unsaturated aldehydes and ketones such as acrolein, methacrolein, vinylmethylketone and vinylbutylketone.

The carbonyl group-containing ethylenically unsaturated monomer can be contained in an amount of 0.1 to 60% by weight, especially 3 to 50% by weight, in the copolymer. If the amount of the carbonyl group-containing ethylenically unsaturated monomer is too small and below the above-mentioned range, it sometimes happens that sufficient adhesion or processability is not obtained in the formed coating layer. If the amount of the ethylenically unsaturated monomer is too large and exceeds the above-mentioned range, the mechanical strength of the formed resin layer is often degraded.

The carbonyl group-containing ethylenically unsaturated monomer can be included in the main chain or side chain of the polymer in the form of a so-called random copolymer, block copolymer or graft copolymer. These copolymers can be prepared by known optional means.

As the copolymer easily available and suitable for attaining the objects of the present invention, an ethylene/vinyl acetate copolymer and an ethylene/acrylic acid copolymer can be mentioned in order of importance.

It is sufficient if the ethylene/carbonyl-ethylene copolymer has a film-forming molecular weight. In view of mechanical characteristics and processability, a copolymer having a melt index (MI) of 0.1 to 300 g/10 min is preferably used.

In the present invention, this blend of chlorinated polypropylene and the ethylene/carbonyl-ethylene copolymer is used as the adhesive. It is preferred that the chlorinated polypropylene:ethylene/carbonyl-ethylene copolymer weight ratio be from 95:5 to 20:80, especially from 90:10 to 20:80. If the ratio of chlorinated polypropylene is too high and exceeds the above-mentioned range, initial bonding by the ethylene/carbonyl-ethylene copolymer at the heat-bonding step is weakened, and sufficient and assured adhesion can hardly be obtained only by heat of the wall of the vessel being formed. Moreover, the wettability of the adhesive is reduced and a die line is left. If the ratio of chlorinated polypropylene is too low and below the above-mentioned range, secondary bonding by chlorinated polypropylene is degraded and no sufficient adhesion is obtaibed.

This blend is soluble in aromatic hydrocarbons such as toluene, ethylbenzene and xylene, halogenated hydrocarbons such as trichloroethylene, tetrachloroethylene and methylchloroform, and alicyclic hydrocarbons such as cyclohexane, methylcyclohexane and ethylcyclohexane. A solution of the blend in a solvent as mentioned above is coated and dried to form an adhesive layer.

In accordance with still another embodiment of the present invention, an ethylene type copolymer composed mainly of ethylene and containing an ethylenically unsaturated carboxylic acid or a derivative thereof is as the adhesive layer 4 in the labels shown in FIGS. 1-A through 1-E. In the present embodiment, excellent bonding of the label to a polyolefin type plastic vessel being formed in the mold is attained, and the adhesion is improved. Accordingly, even if a cosmetic, toiletery product or chemical adheres to the formed vessel, an excellent chemical resistance is attained.

Such the ethylene type copolymer used in the present embodiment comprises ethylene as the main constituent monomer, the copolymer has a high bondability to a polyolefin type plastic vessel, and since the copolymer contains an ethylenically unsaturated carboxylic acid or a derivative thereof, which has a polarity, in the main chain or side chain, the copolymer has an excellent bondability to a printing ink layer. Moreover, since this copolymer is composed mainly of the ethylene polymer chain, the copolymer is molten at a relatively low temperature (generally 60° to 120° C.) and the copolymer gives a strong heat bond by heat possessed by a polyolefin vessel being molded in the mold.

The fact that in the present invention, by using an ethylene type copolymer comprising an ethylenically unsaturated carboxylic acid or a derivative thereof as the comonomer component as the adhesive at the in-mold labelling operation, a high chemical resistance is attained was found as a phenomenon as the result of various experiments made by us. The reason for attainment of this excellent effect has not been completely elucidated. However, from the results of investigations made by us, it is believed that the reason is as described below.

Reduction of the bonding force in a label-bonded vessel on contact with a chemical such as a surface active agent is considered to be due to a kind of stress cracking (environmental cracking). It is presumed that since the ethylene type copolymer used in the present invention is excellent in the stress cracking resistance, the copolymer is probably excellent in the chemical resistance as the adhesive layer. This presumption coincides with the fact that an ethylene/ethyl acrylate copolymer (EEA) has an especially excellent stress cracking resistance over that of ordinary polyethylene.

In the label of the present invention, a layer of the above-mentioned ethylene type copolymer can be directly formed on the printing ink layer. Alternatively, the copolymer can be formed as an adhesive layer 4 on the printing ink layer 3 through an appropriate primer layer 7, as shown in FIG. 1-F. It has been found that if chlorinated polypropylene or a combination of chlorinated polypropylene and a copolymer of ethylene with a carbonyl group-containing ethylene type monomer is used for the primer layer 7, the adhesion to the printing ink layer and the durability of this adhesion are further improved. Moreover, the present embodiment is advantageous in that this primer can be coated on the printing ink layer very easily.

In the label of the present embodiment, all of inks customarily used for printing of plastic films of this type can be used as the printing ink, but two-component reactive inks are preferably used. For example, there can be used inks formed by dispersing an organic or inorganic pigment in such a vehicle as a combination of an epoxy resin and a resin containing a hydroxyl, amino or carboxyl group, or a combination of a urethane resin and a polyester, an acrylic resin or a vinyl resin. If a transparent portion is necessary the vehicle alone is used.

The specific ethylene type copolymer used in the present invention is formed by including an ethylenically unsaturated carboxylic acid or a derivative thereof into the ethylene polymer chain or the side chain thereof by such means as random copolymerization, block copolymerization or graft copolymerization. An ethylenically unsaturated carboxylic acid or an anhydride, alkyl ester, amide, metal salt or organic base salt thereof can be used as the ethylenically unsaturated carboxylic acid or its derivative. Preferred examples are as described below.

A. Ethylenically unsaturated carboxylic acids such as acrylic acid, methacrylic acid, maleic acid, fumaric acid, crotonic acid, itaconic acid, citraconic acid and 5-norbornene-2,3-dicarboxylic acid.
B. Ethylenically unsaturated dicarboxylic anhydrides such as maleic anhydride, citraconic anhydride, 5-norbornene-2,3-dicarboxylic anhydride and tetrahydrophthalic anhydride.
C. Ethylenically unsaturated carboxylic acid esters such as ethyl acrylate, butyl acrylate, methyl methacrylate, ethyl methacrylate, 2-ethylhexyl acrylate, monoethyl maleate, diethyl maleate, propyl $\gamma$-hydroxymethacrylate, ethyl $\beta$-hydroxyacrylate, glycidyl acrylate and glycidyl methacrylate.
D. Ethylenically unsaturated amides and imides such as acrylamide, methacrylamide and maleimide.
E. Metal salts such as sodium acrylate, sodium methacrylate, zinc acrylate and zinc methacrylate.

In view of the adhesiveness and chemical resistance, it is preferred that the ethylenically unsaturated carboxylic acid or its derivative be contained in an amount of 1 to 300 milliequivalents per 100 g, especially 1 to 200 milliequivalents per 100 g, as the carbonyl group $>C=O$ in the ethylene type copolymer used in the present invention. Furthermore, it is preferred that the melt flow rate (MFR) of the ethylene type copolymer be 0.1 to 400 dg/min, especially 0.5 to 300 dg/min, as measured according to JIS K-6730.

As preferred examples of the ethylene type copolymer, there can be mentioned maleic anhydride-grafted polyethylene, an ethylene/ethyl acrylate copolymer and an ionomer (ion-crosslinked ethylene copolymer).

It is preferred that the ethylene type copolymer be formed as a layer having a thickness of 0.01 to 100 $\mu$m, especially 0.1 to 50 $\mu$m. Formation of this adhesive layer can be accomplished by extrusion coating, heat fusion bonding of a film or powder and coating of a dispersion or solution.

The chlorinated polypropylene or its blend described hereinbefore with respect to the adhesive can be used for the primer layer. It is preferred that the thickness of the primer layer be 0.1 to 50 $\mu$m, especially 1 to 10 $\mu$m.

EXAMPLES

The present invention will now be described with reference to the following Examples.

Example 1

One surface of a biaxially drawn film composed of an ethylene/propylene random copolymer having a melting point of 137° C., which had a thickness of 100 $\mu$m, and a heat shrinkage factor of 10% in the machine direction and a heat shrinkage factor of 3% in the transverse direction at the temperature $T_1$ (the temperature lower by 40° C. than the melting point of the plastic material constituting the outer surface of the vessel), that is, at 117° C., was printed, and a sealant composed of chlorinated polypropylene was coated on the print layer.

An oval label having a length of 90 mm and a width of 60 mm was punched out from the obtained label substrate, and according to the steps shown in FIG. 2, the label was bonded to the surface of a bottle composed of an ethylene/propylene copolymer having a forming shrinkage factor of 1.2% and a melting point of 157° C. In this case, the molten resin temperature of the ethylene/propylene copolymer parison was 210° C., and the blow mold temperature was 8° C. The maximum temperature of the bonded surface of the label during the blow-forming operation was 165° C.

The obtained in-mold labelled bottle had a very good appearance and wrinkling of the label or deformation of the bottle was not observed.

When the bonding strength between the label and the bottle was measured, it was found that the bonding strength was 400 g/15 mm. Furthermore, when the bonding strength at 90° C. was measured while taking the hot filling into consideration, it was found that the bonding strength at 90° C. was 300 g/15 mm, and it was confirmed that the heat resistance was sufficient.

The label was peeled from the obtained in-mold labelled bottle, and the label was heat-treated at $T_1 = 117°$ C. for 2 hours and the residual equilibrium shrinkage factor was measured. It was found that the residual equilibrium shrinkage factor was 0.8% in the machine direction.

Examples 2 through 12

In mold labelled bottles were formed in the same manner as described in Example 1 by using various label materials shown in Table 1 (incidentally, in Example 8, the injection blow forming method was adopted). Each bottle had a good appearance, and wrinkling of the label or deformation of the bottle was not observed.

Comparative Example 1

An in-mold labelled bottle was formed in the same manner as described in Example 1 by using a biaxially drawn ethylene/propylene random copolymer film shown in the line of "Comparative Example 1" of Table 1, which had a heat shrinkage factor (0.3%) at $T_1$ (157−40=117° C.) smaller than the forming shrinkage factor (1.2%) of the bottle proper, as the label substrate.

Orange peel wrinkles were formed on the surface of the label of the obtained in-mold labelled bottle.

TABLE 1

| | Label Material | | | | | |
|---|---|---|---|---|---|---|
| | Substrate | | heat shrinkage factor (%) at $T_1$ | | | |
| Example No. | material | melting point (°C.) | machine direction | transverse direction | Print Layer | Sealant |
| 2 | monoaxially drawn ethylene/propylene random copolymer film, thickness = 100 μm | 137 | 39 | 1 | back surface printed | EVA (vinyl acetate content = 10% by weight) + rosin type resin |
| 3 | monoaxially drawn PP foamed film, foaming ratio = 1.6, thickness = 100 μm | 157 | 12 | 3 | front surface printed, overcoat varnish applied | not applied |
| 4 | monoaxially drawn PP foamed film, foaming ratio = 1.5, thickness = 120 μm | 157 | 7 | 1 | front surface printed, overcoat varnish applied | not applied |
| 5 | monoaxially drawn PP film, thickness = 80 μm | 156 | 3.5 | 1.5 | back surface printed | EVA (vinyl acetate content = 15% by weight) + rosin type resin |
| 6 | monoaxially drawn PE foamed film, foaming ratio = 1.5, thickness = 100 μm | 128 | 4.6 | 1.8 | front surface printed, overcoat varnish applied | not applied |
| 7 | biaxially drawn ethylene/propylene random copolymer film, thickness = 100 μm | 137 | 3 | 3 | back surface printed | EVA (vinyl acetate content = 15% by weight) + rosin type resin |
| 8 | biaxially drawn PET film, thickness = 50 μm | 256 | 1.5 | 1.0 | back surface printed | EVA (vinyl acetate content = 10% by weight) + rosin type resin |
| 9 | monoaxially drawn ethylene/propylene random copolymer film, thickness = 100 μm | 137 | 28 | 1 | back surface printed | EVA (vinyl acetate content = 10% by weight) + rosin type resin |
| 10 | monoaxially drawn low-density polyethylene film, thickness = 120 μm | 109 | 20 | 1 | back surface printed | EVA (vinyl acetate content = 10% by weight) + rosin type resin |
| 11 | monoaxially drawn high-density polyethylene film, thickness = 100 μm | 132 | 8 | 0 | back surface printed | EVA (vinyl acetate content = 10% by weight) + rosin type resin |
| 12 | biaxially drawn PP foamed film, foaming ratio = 1.5, thickness = 100 μm | 157 | 6 | 5 | back surface printed, overcoat varnish applied | EVA (vinyl acetate content = 15% by weight) + rosin type resin |
| Comparative Example 1 | biaxially drawn ethylene/propylene random copolymer film, thickness = 80 μm | 158 | 0.3 | 0.2 | back surface printed | EVA (vinyl acetate content = 15% by weight) + rosin type resin |

| | Bottle Proper | | | Bottle-Forming Conditions | | Bonding | Residual Equilibrium |
|---|---|---|---|---|---|---|---|
| Example No. | material | melting point (°C.) | forming shrinkage factor (%) | resin temperature (°C.) | mold temperature (°C.) | Strength (g/15 mm) of Label | Shrinkage Factor (%) at $T_1$ |
| 2 | ethylene-propylene copolymer/ EVOH multiple-layer | 157 (outer layer) | 1.1 | 220 | 8 | 500 | 35 |
| 3 | ethylene-propylene copolymer | 157 | 1.2 | 210 | 10 | 380 | 10 |
| 4 | ethylene-propylene copolymer | 157 | 1.2 | 215 | 8 | 450 | 6 |
| 5 | ethylene-propylene copolymer | 157 | 1.5 | 205 | 9 | 350 | 1.4 |
| 6 | high-density polyethylene | 132 | 2.5 | 230 | 10 | 520 | 1.8 |
| 7 | low-density polyethylene/ EVOH multiple-layer | 109 (outer layer) | 1.9 | 220 | 10 | 380 | 0.8 |
| 8 | polyethylene terephthalate | 257 | 0.5 | parison temperature, 110 | 80 | 340 | 0.6 |
| 9 | high-density polyethylene | 132 | 2.6 | 235 | 10 | 480 | 24 |
| 10 | low-density polyethylene | 109 | 2.8 | 230 | 10 | 390 | 16 |
| 11 | high-density polyethylene | 132 | 2.4 | 225 | 8 | 380 | 3 |

TABLE 1-continued

| | Label Material | | | | | | |
|---|---|---|---|---|---|---|---|
| 12 | ethylene/propylene copolymer | 157 | 1.2 | 220 | 10 | 300 | 3 |
| Comparative Example 1 | ethylene/propylene copolymer | 157 | 1.2 | 215 | 10 | 340 | 0 |

Example 13

One surface of a biaxially drawn film composed of an ethylene/propylene copolymer having a melting point of 137° C., which had a thickness of 100 μm and an MD heat shrinkage factor of 14% and a TD heat shrinkage factor of 3.0% at $T_1$ (the temperature lower by 30° C. than the melting point of the plastic material), that is, at 127° C., was printed, and an acryl polyol/isocyanate type anchoring agent was coated on the print layer and aluminum was vacuum-deposited in a thickness of 500 Å on the anchoring agent layer. Then, a primer was coated on the aluminum-vacuum-deposited surface and a sealant composed of chlorinated polypropylene was coated on the primer layer.

An oval label having a length of 90 mm and a width of 60 mm was punched out from the obtained label substrate and the label was bonded to the surface of a bottle composed of an ethylene/propylene copolymer having a forming shrinkage factor of 1.2% and a melting point of 157° C. according to the steps shown in FIG. 2. In this case, the molten resin temperature of the ethylene/propylene copolymer parison was 210° C. and the blow mold temperature was 8° C.

The obtained in-mold labelled bottle had a very good appearance, and no wrinkle was observed on the label.

When the bonding strength between the label and the bottle was measured, it was found that the bonding strength was 650 g/15 mm of the width. When the bonding strength at 85° C. was measured while taking the hot filling into consideration, it was found that the bonding strength at 85° C. was 300 g/15 mm of the width. It was confirmed that the heat resistance was sufficient.

When the label film was peeled from the obtained in-mold labelled bottle and heat-treated for 2 hours at $T_1 = 127°$ C. and the residual equilibrium shrinkage factor was measured, it was found that the residual equilibrium shrinkage factor was 12% in the machine direction.

Example 14

One surface of a biaxially drawn film composed of an ethylene/propylene copolymer having a melting point of 137° C., which had an MD heat shrinkage factor of 14% and a TD heat shrinkage factor of 3.0% at $T_1 = 127°$ C. and a thickness of 100 μm was printed and a urethane type adhesive was coated on the print layer and an aluminum foil having a thickness of 6 μm was laminated on the adhesive layer. Then, a primer was coated on the surface of the aluminum foil and a sealant composed of a blend of an ethylene/vinyl acetate copolymer with a rosin resin was coated on the primer layer.

An oval label having a length of 90 mm and a width of 60 mm was punched out from the obtained label substrate and the label was bonded to the surface of a bottle composed of an ethylene/propylene copolymer having a forming shrinkage factor of 1.2% and a melting point of 157° C. according to the steps shown in FIG. 2. In this case, the molten resin temperature of the ethylene/propylene copolymer parison was 210° C., and the blow mold temperature was 8° C.

The appearance of the obtained in-mold labelled bottle was very good and no wrinkle was observed on the surface of the label.

When the bonding strength between the label and the bottle was measured, it was found that the bonding strength was 310 g/15 mm of the width.

When the label film was peeled from the in-mold labelled bottle and heat-treated for 2 hours at $T_1 = 127°$ C. and the residual equilibrium shrinkage factor was measured, it was found that the residual equilibrium shrinkage factor was 12.5% in the machine direction.

Example 15

One surface of a biaxially drawn film composed of an ethylene/propylene copolymer having a melting point of 137° C., which had a thickness of 100 μm, was printed, and a hot-melt adhesive comprising EVA (vinyl acetate content = 20% by weight), a rosin type resin and 10% by weight of acrylic hollow beads having a volume average particle size of 40 μm an apparent density of 0.5 g/cc was coated and dried on the print layer by using a gravure roll having a 45-line lattice pattern. The center line average height on the surface of the adhesive layer of the obtained label substrate was 1.2 μm.

A rectangular label having a length of 90 mm and a width of 60 mm was punched out from the obtained label substrate, and about 500 of so-obtained labels were charged in the stacked state in the magazine of the in-mold labelling apparatus shown in FIG. 6. These labels were taken out one by one from the magazine by a label-bonding head having an attracting cap attached to the top end thereof and charged in blow molds as shown in FIG. 5. In this operation of talking out labels one by one from the magazine by the attracting cap, take-out of two piled labels was not caused.

According to the steps shown in FIG. 5, the label was bonded to the surface of a bottle composed of an ethylene/propylene copolymer having a forming shrinkage factor of 1.2% and a melting point of 157° C. In this case, the molten resin temperature of the ethylene/propylene copolymer parison was 210° C. and the blow mold temperature was 8° C. The maximum temperature of the bonded surface of the lavel was 165° C. during the blow-forming operation.

The appearance of the obtained in-mold labelled bottle was very good, and wrinkling of the label or deformation of the bottle was not observed.

When the bonding strength between the label and the bottle was measured, it was found that the bonding strength was 450 g/15 mm.

Comparative Example 2

The procedures of Example 15 were repeated in the same manner except that labels were prepared by using the hot-melt adhesive in which the acrylic beads were not incorporated. During the operation of taking out labels from the magazine by the attracting cap, take-out of two labels in the stacked state occurred at a frequency of 4%.

Examples 16 through 19

In-mold labelled bottles were formed in the same manner as described in Example 15 by using adhesive materials obtained by incorporating bead materials shown in Table 2 into adhesive materials shown in Table 2. In each case, the operation of taking out labels from the magazine could be performed smoothly and take-out of two labels in the stacked state was not caused. The bonding strength of the label was measured with respect to each of the in-mold labelled bottles. The obtained results are shown in Table 2. In each case, it was found that the adhesion was very good.

in FIG. 2. During this operation of taking out labels one by one from the magazine, take-out of two labels in the stacked state was not caused at all. At this operation, the temperature of air around the label magazine was 26° C. Then, the label was bonded to the surface of a bottle composed of an ethylene/propylene copolymer having a forming shrinkage factor of 1.2% and a melting point of 157° C. according to the steps shown in FIG. 5. In this case, the molten resin temperature of the ethylene/propylene copolymer parison was 210° C. and the blow mold temperature was 8° C.

The appearance of the obtained in-mold labelled bottle was very good, and wrinkling of the label or deformation of the bottle was not observed at all.

When the bonding strength between the label and the bottle was measured, it was found that the bonding strength was 420 g/15 mm of the width.

TABLE 2

|  | Adhesive Material | Beads material | Beads average particle size (μm) | Beads apparent density (g/cc) | content (% by weight) | Gravure Roll (kind, line, number) | Center Line Average Height (μm) | Label Bonding Strength (g/15 mm) |
| --- | --- | --- | --- | --- | --- | --- | --- | --- |
| Example 16 | EVA (vinyl acetate content = 15% by weight) | silica | 60 | 0.25 | 8 | lattice pattern, 65 lines | 1.5 | 450 |
| Example 17 | EVA (vinly acetate content = 10% by weight) + rosin type resin | silica acrylic beads | 30 40 | 0.24 0.62 | 6 6 | pyramid pattern, 40 lines | 1.8 | 530 |
| Example 18 | ethylene/acrylic acid copolymer + terpene type resin | glass | 30 | 0.22 | 7 | inclined line pattern, 38 lines | 0.7 | 580 |
| Example 19 | chlorinated polypropylene | PP powder | 40 | 0.9 | 30 | lattice pattern, 45 lines | 3.5 | 600 |

Example 20

One surface of a biaxially drawn film composed of an ethylene/propylene random copolymer having a melting point of 137° C., which had a thickness of 100 μm, was printed, and a solvent type hot-melt adhesive comprising an ethylene/vinyl acetate copolymer and a rosin type resin was coated on the print layer. A polyester-urethane containing 20% of a silicone oil was coated on the other surface to form an overcoat layer. The static friction coefficient of the surface of the overcoat layer was 0.12.

A rectangular label having a length of 90 mm and a width of 60 mm was punched out from the obtained label substrate, and about 500 of so-obtained labels were charged in a magazine of an in-mold labelling apparatus, taken out one by one from the magazine by a label-bonding head having an attracting cap attached to the top end thereof and attached to split blow molds shown

Comparative Example 3

The procedures of Example 20 were repeated in the same manner by using labels having no overcoat layer formed thereon. During the operation of taking out the labels from the magazine, take-out of two labels in the stacked state was caused at a frequency of 4%. The static friction coefficient of the label was 0.35. The temperature of air around the label magazine was 26° C.

Examples 21 through 23 and Comparative Examples 4 and 5

In-mold labelled bottles were formed by using labels having overcoat layers of release resins shown in Table 3 and labels comprising substrate films shown in Table 3. The static friction coefficients of the outer surfaces of the respective labels were measured, and the take-out properties of the labels were examined. The obtained results are shown in Table 4.

TABLE 3

|  | Overcoat Layer | Film Substrate | Adhesive | Static Friction Coefficient of Label Surface | Frequency (%) of Occurrence of Take-Out of Two Labels |
| --- | --- | --- | --- | --- | --- |
| Example 21 | silica + paraffin + vinyl chloride-vinyl acetate-urethane | monoaxially drawn polypropylene film, thickness = 100 μm | chlorinated polypropylene | 0.11 | 0 |
| Example 22 | paraffin + polyester-urethane | monoaxially drawn polypropylene film, thickness = 100 μm | chlorinated polypropylene | 0.13 | 0 |
| Example 23 | polyamide + 10% of Teflon | biaxially drawn polypropylene film, thickness = 100 μm | EVA (vinyl acetate content = 30%) + petro- | 0.12 | 0 |

TABLE 3-continued

|  | Overcoat Layer | Film Substrate | Adhesive | Static Friction Coefficient of Label Surface | Frequency (%) of Occurrence of Take-Out of Two Labels |
|---|---|---|---|---|---|
| Comparative Example 4 | — | biaxially drawn polyester film, thickness = 50 μm | leum resin EVA (vinyl acetate content = 35%) | 0.41 | 11 |
| Comparative Example 5 | — | monoaxially drawn polyethylene film, thickness = 60 μm | EVA + rosin type resin | 0.44 | 12 |

Example 24

One surface of a drawn polypropylene film having a thickness of 100 μm was printed with an ink comprising a polyester-urethane, and chlorinated polyethylene having a chlorine content of 26% by weight, a crystal-melting peak temperature of 90° C., a crystal-melting heat quantity of 2.2 cal/g and a viscosity of 4 P (at 25° C.) as measureed with respect to a toluene solution having a concentration of 15 g/100 ml was coated in a thickness of 5 μm on the print layer to form an adhesive layer.

A rectangular label having a length of 90 mm and a width of 60 mm was punched out from the obtained label substrate and bonded to the surface of a bottle composed of an ethylene/propylene copolymer having a melting point of 157° C. according to the steps shown in FIG. 2. In this case, the molten resin temperature of the ethylene/propylene copolymer parison was 210° C. and the blow mold temperature was 8° C.

Example 25 and Comparative Examples 6 and 7

Labels were prepared in the same manner as described in Example 24 by using various chlorinated polypropylenes differing in the chlorine content, and by using these labels, in-mold labelled bottles were formed and the bonding strength between the label and the bottle was measured. The obtained results are shown in Table 5.

Example 26

One surface of a drawn polypropylene film having a thickness of 100 μm was printed with an ink comprising a polyester-urethane, and a medium of a polyester-urethane was coated on the print layer. Then, a blend comprising chlorinated polypropylene A having a chlorine content of 26% by weight, a crystal-melting peak temperature of 90° C. and a crystal-melting heat quantity of 2.2 cal/g, chlorinated polypropylene B having a chlorine content of 35% by weight, a crystal-melting peak temperature of 62° C. and a crystal-melting heat quantity of 0.8 cal/g and an ethylene/vinyl acetate copolymer having MI of 80 and a vinyl acetate content of 43% at a mixing weight ratio of 30/35/35 was coated in a thickness of 1.5 μm on the polyester-urethane medium to form an adhesive layer.

A rectangular label having a length of 90 mm and a width of 60 mm was punched out from the obtained label substrate, and the label was bonded to the surface of a bottle composed of an ethylene/propylene copolymer having a melting point of 158° C. according to the steps shown in FIG. 2. In this case, the molten resin temperature of the ethylene/propylene copolymer parison was 210° C., and the blow mold temperature was 7° C.

The appearance of the obtained in-mold labelled bottle was very good.

Examples 27 through 29 and Comparative Examples 8 and 9

Labels were prepared in the same manner as described in Example 26 by using various chlorinated polypropylene-ethylene/vinyl acetate copolymer blends differing in the mixing ratio as the adhesive, and by using these labels, in-mold labelled bottles were formed and the appearance and bonding strength were evaluated. Furthermore, the immersion test and falling test were carried out. The obtained results are shown in Table 5. Incidentally, the chlorinated polypropylene and EVA used were the same as the those used in Example 26.

TABLE 4

|  | Bottle Material | Binder of Ink | Chlorinated Polypropylene Adhesive | | | Bonding Strength (g/15 mm of width) between Label and Bottle | | Appearance of Formed Bottle |
|---|---|---|---|---|---|---|---|---|
|  |  |  | chlorine content (%) | melting point (°C.) | crystal-melting heat quantity (cal/g) | HD | TD |  |
| Example 25 | ethylene/ propylene copolymer | polyester-urethane | 21 | 100 | 3 | 410 | 580 | good |
| Comparative Example 6 | ethylene/ propylene copolymer | polyester-urethane | 2 | 155 | 12 | 100 |  | rising portion formed between label and bottle |
| Comparative Example 7 | ethylene/ propylene copolymer | polyester-urethane | 70 | — | — | 50 |  | rising portion formed between label and bottle |

TABLE 5

| | Bottle Material | Chlorinated PP:EVA ClPP A:ClPP B:EVA | Bonding Strength (g/15 mm) between Label and Bottle | | Appearance | Immersion Test in Shampoo (40° C., 24 hours) | Falling Test (5° C., 1.2 m) |
|---|---|---|---|---|---|---|---|
| | | | HD | WD | | | |
| Example 27 | ethylene/propylene copolymer | 50:25:25 | 410 | 320 | good | no change | no change |
| Example 28 | ethylene/propylene copolymer | 0:50:50 | 280 | 310 | good | no change | no change |
| Example 29 | ethylene/propylene copolymer | 0:30:70 | 270 | 300 | good | no change | no change |
| Comparative Example 8 | ethylene/propylene copolymer | 99:0:1 | 380 | 540 | die line seen (transparent portion) | peeling in edge portion | no change |
| Comparative Example 9 | ethylene/propylene copolymer | 1:99 | 220 | 220 | good | no change | peeling of label |

When the bonding strength between the label and the bottle was measured, it was found that the bonding strength was 400 g/15 mm of width if sampling was effected in the height direction (HD) of the bottle and the bonding strength was 600 g/15 mm of the width if sampling was effected in the width direction (WD) of the bottle. Incidentally, the bonding strength was determined by the 90° peel test at a peeling speed of 300 mm/min. When the bonding strength at 85° C. was measured while taking the hot filling into consideration, it was found that the HD bonding strength was 270 g/15 mm of the width and the WD bonding strength was 400 g/15 mm of the width.

In order to examine reduction of the adhesion of the label by sticking of the content, the in-mold labelled bottle was immersed in a rinse, hair tonic or shampoo at 40° C. for 24 hours. No substantial change of the appearance was caused in the label in any of these contents, and the bonding strength was not substantially changed in any of these contents. Namely, the HD bonding strength was 450 g/15 mm of the width in case of the rinse, the HD bonding strength was 510 g/15 mg of the width in case of the shampoo, and the HD bonding strength was 380 g/15 mm of the width in case of the hair tonic.

When the bonding strength between the label and the bottle was measured, it was found that the bonding strength was 540 g/15 mm of the width if sampling was effect in the height direction (HD) of the bottle and the bonding strength was 780 g/15 mm of the width if sampling was effected in the width direction (WD) of the bottle. Incidentally, the bonding strength was measured by the 90° C. peel test at a peeling speed of 300 mm/min.

In order to examine reduction of the adhesion of the label by sticking of the content, the in-mold labelled bottle was immersed in a rinse or shampoo at 40° C. for 24 hours. No substantial change of the appearance was caused in any of the contents, and the bonding strength was not substantially reduced in any of the contents. Namely, the HD bonding strength was 500 g/15 mm of the width in case of the rinse and the HD bonding strength was 530 g/15 mm of the width in case of the shampoo.

Furthermore, the in-mold labelled bottle was filled with water and allowed to stand still at 5° C. for 1 day. Then, the bottle was let to fall down on a concrete floor from a height of 1.2 m five times in the vertical posture and 5 times in the horizontal posture. Peeling of the label was not observed at all.

Example 30

One surface of a drawn polypropylene film having a thickness of 100 μm was printed with an ink comprising a polyvinyl-urethane as a binder and a polyvinyl-urethane ink medium was coated on the ink layer, and an ethylene/ethyl acrylate copolymer having an ethyl acrylate content of 25% by weight, a crystal-melting peak temperature of 70° C. and a melt flow rate of 275 dg/min was coated in a thickness of 5 μm on the medium layer to form an adhesive layer.

A rectangular label having a length of 100 mm and a width of 80 mm was punched out from the obtained label substrate, and the label was bonded to the surface of a multiple-layer bottle comprising an outer surface layer composed of low-density polyethylene having a melting point of 110° C. and an inner layer composed of high-density polyethylene having a melting point of 130° C. according to the steps shown in FIG. 2.

In this case, the molten resin temperature was 200° C. and the blow mold temperature was 7° C.

The appearance of the obtained in-mold labelled bottle was very good.

When the bonding strength between the label and the bottle was measured, it was found that the bonding strength was 500 g/15 mm of the width if sampling was effected in the height direction (HD) of the bottle and the bonding strength was 400 g/15 mm of the width if sampling was effected in the width direction (WD) of the bottle. Incidentally, the bonding strength was determined by the 90° peel test at a peeling speed of 300 mm/min.

Example 31

One surface of a drawn polypropylene film having a thickness of 100 μm was printed with an ink comprising a polypropylene A having a chlorine content of 26% by weight, a crystal-melting peak temperature of 90° C. and a crystal-melting heat quantity of 2.2 cal/g, chlorinated polypropylene B having a chlorine content of 35% by weight, a crystal-melting peak temperature of 62° C. and a crystal-melting heat quantity of 0.8 cal/g and an ethylene/vinyl acetate copolymer having MI of 80 and a vinyl acetate content of 43% at a mixing ratio of 30/35/35 was coated in a thickness of 1.5 μm on the print layer. Then, an ethylene/ethyl acrylate copolymer (EEA) having an ethyl acrylate content of 25% by weight, a crystal-melting peak temperature of 75° C. and a melt flow rate of 5 dg/min was coated in a thickness of 4 μm of the blend layer to form an adhesive layer.

A rectangular label having a length of 100 mm and a width of 80 mm was punched out from the obtained label substrate, and the label was bonded to the surface of a multiple-layer bottle comprising an outer surface layer composed of low-density polyethylene having a melting point of 110° C. and an inner layer composed of high density polyethylene having a melting point of 130° C. according to the steps shown in FIG. 2.

In this case, the molten resin temperature was 200° C. and the blow mold temperature was 7° C.

The appearance of the obtained in-mold labelled bottle was very good.

When the bonding strength between the label and the bottle was measured, it was found that the bonding strength was 750 g/15 mm of the width if sampling was effected in the height direction (HD) of the bottle and the bonding strength was 790 g/15 mm of the width if sampling was effected in the width direction (WD) of the bottle. Incidentally, the bonding strength was determined by the 90° peel test at a peeling speed of 300 mm/min.

In order to examine reduction of the bonding strength by sticking of the content, the in-mold labelled bottle was immersed in a shampoo at 40° C. for 24 hours. The appearance of the label was not changed by this immersion in the shampoo. It was found that the HD bonding strength was 560 g/15 mm of the width and the WD bonding strength was 700 g/15 mm of the width. Accordingly, it was confirmed that the bonding strength was maintained at a high level.

The in-mold labelled bottle was filled with water and allowed to stand still at 5° C. for 1 day, and the falling test was carried out by dropping the bottle on a concrete floor from a height of 1.2 m five times in the vertical posture and five times in the horizontal posture. Peeling of the label was not found.

Examples 32 through 38 and Comparative Examples 10 through 13

In-mold labelled bottles were formed in the same manner as described in Example 31 by changing the ethyl acrylate content in the adhesive EEA or using various polymers as the adhesive instead of EEA. The appearance and bonding strength were evaluated, and the immersion test in the shampoo and the falling test were carried out. The obtained results are shown in Table 6.

TABLE 6

| | ethylene copolymer | Adhesive content (% by weight) of ethylenically unsaturated carboxylic acid or its derivative | melt flow rate (dg/min) | thickness (μm) | HD Bonding Strength (g/15 mm of width) | Immersion Test (40° C., 24 hours) | Falling Test (5° C., 1.2 m, 5 times in either vertical or horizontal posture) |
|---|---|---|---|---|---|---|---|
| Example 32 | EEA | 9 | 5 | 20 | 2100 | good appearance | no change in label |
| Example 33 | EEA | 17 | 25 | 5 | 1400 | good appearance | no change in label |
| Example 34 | EEA | 19 | 5 | 5 | 900 | good appearance | no change in label |
| Example 35 | EEA | 25 | 275 | 5 | 700 | good appearance | no change in label |
| Example 36 | EEA | 35 | 5 | 5 | 600 | good appearance | no change in label |
| Comparative Example 10 | EEA | 0.01 | 7 | 15 | 100 | delamination | peeling |
| Comparative Example 11 | EEA | 55 | 80 | 5 | 200 | delamination | peeling |
| Example 37 | maleic anhydride-modified polyethylene | 10 | 20 | 0.5 | 600 | good appearance | no change in label |
| Example 38 | ionomer | 13 | 5 | 15 | 800 | good appearance | no change in label |
| Comparative Example 12 | ethylene/vinyl acetate copolymer | 41 | 65 | 5 | 220 | delamination | peeling |
| Comparative Example 13 | ethylene/vinyl acetate copolymer | 46 | 95 | 4 | 210 | delamination | peeling |

We claim:

1. A process for the preparation of a labelled hollow vessel having a non-bulging and non-wrinkling outer label surface with excellent adhesion and peeling resistance, which comprises preparing a label composed mainly of a drawn film of a plastic material having a heat shrinkage factor measured in the machine direction larger than the forming shrinkage factor of a plastic material constituting the outer surface of a vessel wherein the heat shrinkage factor is measured at a temperature ($T_1$) lower by 40° C. than the melting point or softening point of the plastic material constituting the outer surface of the vessel;

attaching the label to the inner surface of a cavity of a blow mold;

blow-forming a single-layer or multiple-layer plastic parison or sheet in the blow mold to bond the label to the surface of a side wall portion of the vessel formed, and wherein the plastic material constituting the outer surface of the vessel is a polyolefin.

2. A process according to claim 1, wherein the residual equilibrium shrinkage factor (Rs), defined by the following formula, of the drawn plastic film is in the range of from 0.5 to 100%:

$$Rs = \frac{L_1 - L_2}{L_1} \times 100$$

wherein $L_1$ is the length of the label film peeled from the vessel and $L_2$ is the length of said peeled label film equilibriated at a temperature ($T_1$) lower by 40° C. than the melting point or softening point of the plastic material constituting the outer surface of the vessel.

3. A process according to claim 1, wherein the label is a laminate comprising
an outer layer of said drawn plastic film,
a print layer formed on the inner side of the film and
an inner layer of a hot-melt adhesive resin.

4. A process according to claim 1, wherein the resin constituting at least the outer surface of the vessel is an olefin resin and the drawn plastic film is a drawn olefin resin film.

5. A process according to claim 4, wherein the drawn plastic film is a drawn foamed olefin resin film.

6. A process according to claim 1, wherein the label is a laminate comprising
at least one layer of a drawn plastic film having a heat shrinkage factor larger than the forming shrinkage factor of the plastic material constituting the outer surface of the vessel at a temperature ($T_1$) lower by 30° C. than the melting point or softening point of the plastic material constituting the outer surface of the vessel,
a thin layer of a metal having a thickness of 50 to 150,000 Å and
a thermoplastic adhesive layer.

7. A process according to claim 6, wherein the laminate has a layer structure comprising an outer layer of a drawn plastic film, an intermediate layer of a metal foil and an inner layer of a thermoplastic adhesive.

8. A process according to claim 6, wherein the laminate has a layer structure comprising an outer layer of a drawn plastic film, an intermediate layer of a metal-vacuum-deposited drawn plastic film and an inner layer of a thermoplastic adhesive.

9. A process according to claim 1, wherein the process comprises
stacking many labels in a magazine,
sucking and delivering the labels into the mold one by one, and
attaching the delivered label to the surface of the mold.

10. A process according to claim 1, wherein the label comprises
a layer of said drawn plastic film,
a print layer formed on the inner face side of the film layer,
a hot-melt adhesive layer formed on the print layer and,
optionally, an overcoat layer formed on the outer surface side of the film layer, and
wherein resin beads, inorganic beads or a mixture of resin beads and inorganic beads having a particle size of 0.1 to 100 μm are present in any one of the print layer, the hot-melt adhesive layer and the overcoat layer and the center line average height as measured by JIS B-0601 in any of the surfaces of the label is 0.2 to 50 μm.

11. A process according to claim 1, wherein the label is a laminate comprising a substrate of said drawn plastic film and an adhesive layer of chlorinated polypropylene formed on one surface of the substrate.

12. A process according to claim 1, wherein the label is a heat-bondable film label comprising a layer of said drawn plastic film, a print layer formed on the inner surface side of the film layer, a hot-melt adhesive layer formed on the print layer and an overcoat layer composed of a release substance having a static friction coefficient smaller than 0.20.

13. A process according to claim 1, wherein the label is a laminate comprising a substrate of said drawn plastic film and an adhesive layer composed of a blend of chlorinated polypropylene and a copolymer of ethylene with a carbonyl group-containing ethylenic monomer, which is formed on one surface of the substrate.

14. A process according to claim 1, wherein the label is a laminate comprising a substrate of said drawn plastic film and an adhesive layer of a copolymer composed mainly of ethylene and containing an ethylenically unsaturated carboxylic acid or a derivative thereof as a comonomer, which is formed on one surface of the substrate.

15. A labelled vessel comprising
a plastic vessel formed by blow-molding and
a label bonded to the surface of a side wall portion of the vessel by an in-mold labelling operation, wherein the plastic material constituting the outer surface of the vessel is a polyolefin, and the label is a label comprising a drawn plastic film as the substrate and the label is bonded to the vessel so that the residual equilibrium shrinkage factor (Rs), defined by the following formula, of the drawn plastic film is from 0.5 to 100%:

$$Rs = \frac{L_1 - L_2}{L_1} \times 100$$

wherein $L_1$ is the length of the label film peeled from the vessel and $L_2$ is the length of said peeled label film equilibrated at a temperature ($T_1$) lower by 40° C. than the melting point or softening point of the plastic material constituting the outer surface of the vessel.

16. A labelled vessel as set forth in claim 15, wherein the resin constituting at least the outer surface of the vessel is an olefin resin and the drawn plastic film is a drawn olefin resin film.

17. A labelled vessel as set forth in claim 15, wherein the drawn plastic film is a drawn foamed olefin resin film.

18. A labelled vessel as set forth in claim 15, wherein the label is a laminate comprising an outer layer of said drawn plastic film, a print layer formed on the inner surface side of the film and an inner layer of a hot-melt adhesive.

19. A labelled vessel as set forth in claim 18, wherein the adhesive layer is chlorinated polypropylene.

20. A labelled vessel as set forth in claim 18, wherein the adhesive layer is a blend comprising chlorinated polypropylene and a copolymer of ethylene with a carbonyl group-containing ethylenic monomer.

21. A labelled vessel as set forth in claim 18, wherein the adhesive resin layer comprises an ethylenic copolymer composed mainly of ethylene and containing and ethylenically unsaturated carboxylic acid or a derivative thereof as a comonomer.

22. A labelled vessel as set forth in claim 15, wherein the label is a laminate comprising at least one layer of said drawn plastic film, a thin layer of a metal and a thermoplastic adhesive layer.

23. A labelled vessel as set forth in claim 15, wherein the label comprises
- a layer of said drawn plastic film,
- a print layer formed on the inner face side of the film layer,
- a hot-melt adhesive layer formed on the print layer and,
- optionally, an overcoat layer formed on the outer surface side of the film layer, and wherein resin beads, inorganic beads or a mixture of resin beads and inorganic beads having a particle size of 0.1 to 100 $\mu$m are incorporated in any one of the print layer, the hot-melt adhesive layer and the overcoat layer and the center line average height as measured by JIS B-0601 in any of the surfaces of the label is 0.2 to 50 $\mu$m.

24. A labelled vessel as set forth in claim 15, wherein the label is a heat-bondable film label comprising a layer of said drawn plastic film, a print layer formed on the inner surface side of the film layer, a hot-melt adhesive layer formed on the print layer and an overcoat layer composed of a release substance having a static friction coefficient smaller than 0.20.

* * * * *